United States Patent

Goñi et al.

[11] Patent Number: 5,991,641
[45] Date of Patent: Nov. 23, 1999

[54] METHOD AND APPARATUS FOR PROVIDING CELLULAR RADIO SERVICE TO STANDARD ANALOG TERMINALS

[75] Inventors: Joaquin Ignacio Goñi, Barrika; Julio Salazar Orive, Bilboa; Guillermo Lafarga Ibáñez, Castro Urdiales, all of Spain

[73] Assignee: Telefonaktiebolaget LM Ericsson, Stockholm, Sweden

[21] Appl. No.: 08/992,802

[22] Filed: Dec. 18, 1997

Related U.S. Application Data

[63] Continuation-in-part of application No. 08/870,489, Jun. 6, 1997.

[51] Int. Cl.$^6$ ............................................. H04Q 7/38
[52] U.S. Cl. ..................... 455/557; 455/74.1; 455/426; 455/411
[58] Field of Search .................................. 455/411, 554, 455/557, 74.1

[56] References Cited

U.S. PATENT DOCUMENTS

| | | | |
|---|---|---|---|
| 4,658,096 | 4/1987 | West, Jr. et al. | 455/426 |
| 4,718,080 | 1/1988 | Serrano et al. | 455/74.1 |
| 4,922,517 | 5/1990 | West, Jr. et al. | 455/426 |
| 4,959,851 | 9/1990 | Tobolski, Jr. et al. | 455/426 |
| 5,117,450 | 5/1992 | Joglekar et al. | 455/426 |
| 5,689,557 | 11/1997 | Kaplan | 379/355 |
| 5,812,637 | 9/1998 | Schornack et al. | 455/422 |
| 5,864,763 | 1/1999 | Leung et al. | 455/557 |

FOREIGN PATENT DOCUMENTS

| | | | |
|---|---|---|---|
| 96/15638 | 5/1996 | WIPO | H04Q 7/22 |
| 96/32824 | 10/1996 | WIPO | H04Q 7/32 |

*Primary Examiner*—Dwayne D. Bost
*Assistant Examiner*—Alan Gantt
*Attorney, Agent, or Firm*—Burns, Doane, Swecker & Mathis, L.L.P.

[57] ABSTRACT

A method and apparatus set up a call between at least one standard analog terminal and a remote terminal in a network, via a radio terminal and a radio base station. The contents of a memory are initially cleared. If a first dialed digit is received from the standard analog terminal, verification of the radio terminal status is terminated, if it is in progress, and the first dialed digit is stored in the memory, forming the contents of the memory. Verification of the radio terminal status includes, for example, sampling and evaluation of radio signal strengths, determining the service restrictions of the radio terminal, and determining whether the radio terminal is authorized to make a call from the cell in which it is located, using an operator's SIM card. Verification of the radio terminal status is initiated, and the contents of the memory are sent to a buffer. If a subsequently dialed digit is received from the standard analog terminal, verification of the radio terminal status is terminated. The subsequently dialed digit is stored in the memory, together with the contents of the memory, to form updated contents. Verification of the radio terminal status is initiated, and the updated contents are sent to the buffer. When verification of the radio terminal status is completed, and the radio terminal is determined to be ready for call set up, call set up processing is initiated or a request for call set up is sent from the radio terminal to the radio base station. These steps are repeated for each subsequently dialed digit, as long as the subsequently dialed digit is received from the standard analog terminal before call setup processing is initiated or before a request for call setup is sent from the radio terminal to the radio base station.

19 Claims, 19 Drawing Sheets

METHOD AND APPARATUS FOR PROVIDING CELLULAR RADIO SERVICE TO STANDARD ANALOG TERMINALS

CROSS REFERENCE TO RELATED APPLICATIONS

The present application is a Continuation in Part Application of U.S. patent application Ser. No. 08/870,489 (File Date Jun. 6, 1997).

BACKGROUND OF THE INVENTION

This invention relates to a method and apparatus for cellular communication. More particularly, this invention relates to a method and apparatus for setting up a call between at least one standard analog terminal and a remote terminal in a network, via a radio terminal, or accessing a remote terminal or requesting a special service in a network from at least one standard analog terminal, via a radio terminal, while the radio terminal is engaged in a conversation with another remote terminal in the network.

Cellular radio telephone systems provide for communication among mobile stations and fixed telephone networks. Typically, a cellular system includes cellular transceivers or terminals connected to a Radio Base Station (RBS) that enables calls to be transmitted to and received from the cellular network via a Base Station Controller (BSC) and a Mobile Switching Center (MSC).

A standard Plain Old Telephone System (POTS) telephone can be interfaced with a fixed cellular terminal (FCT) so that a call can be set up at or received by the POTS telephone terminal via the FCT, avoiding the need for wiring the POTS telephone to a local exchange. The FCT alerts the POTS telephone when an incoming call is received, causing the POTS telephone to ring. The FCT is typically implemented with a modified cellular radio terminal that provides the line card functions normally provided by the local exchange in the POTS.

A difficulty that arises in interfacing standard POTS telephones with FCTs is that the procedure by which a telephone connection is established in a POTS is different from the procedure by which a connection is established in a cellular radio telephone system.

In a POTS, the line card in the local exchange provides a dial tone when the POTS telephone goes off-hook. After the first dialed digit is received in the line card from the POTS telephone, the dial tone is terminated, and the line card continues to receive subsequently dialed digits in sequence, passing them directly to the group switch. The group switch analyzes the dialed digits and makes a connection to the telephone terminal corresponding to the dialed digits, if the sequence of dialed digits is valid. If a complete or valid dialing sequence is not received by the group switch before a timer has expired, the group switch releases the connection, and the line card sends a busy signal or an error signal to the POTS telephone.

In contrast, in a cellular radio telephone system, a subscriber uses the keypad of a cellular terminal, such as a mobile telephone, to enter dialed digits into a memory and then presses a dedicated 'SEND' key which initiates call set up processing. In the cellular terminal, call set up processing generally begins by scanning for control channels broadcast by the RBS, locking onto one of the available control channels, and receiving and decoding overhead information. The cellular terminal then transmits a random access message to the RBS requesting call set up. The request usually involves some type of authentication handshake between the RBS and the cellular terminal. After authentication and further communication, a voice channel is eventually opened, and the call is completed. The details of call set up processing vary depending upon the air interface standard (e.g., AMPS, TACS, GSM, IS-136, IS-95, etc.) employed by a particular cellular system.

A problem encountered when interfacing a POTS telephone with an FCT is that a POTS telephone does not have a 'SEND' key. Thus, some other way must be provided for a POTS telephone to initiate the call set up processing in the FCT.

Several systems have been proposed for overcoming this problem of interfacing a standard POTS telephone with an FCT. For example, U.S. Pat. No. 4,718,080 to Serrano discloses a system in which, after a telephone number is dialed at a standard POTS telephone, a 'SEND' signal is simulated, and the dialed digits are transmitted to the cellular terminal. Dialing sequences can also be entered at the standard POTS telephone to control features of the standard POTS telephone, such as volume control. U.S. Pat. No. 4,658,096 to West, Jr. et al. and its related patents disclose a system in which a 'SEND' signal is transmitted to a cellular terminal after the last digit has been dialed at the standard POTS telephone. The system determines whether the last digit has been dialed based on a logical analysis of the dialed digits or on time elapsed after the last digit has been dialed. A problem with these approaches is that some sort of determining algorithm or a timer is required to determine when the last digit is dialed, which increases the cost and complexity of the FCT.

Systems employing predetermined dialing sequences to instruct a cellular terminal to perform certain functions are also known. For example, U.S. Pat. No. 4,959,851 to Tobolski, Jr. et al. discloses a system in which predetermined dialing sequences consisting of leading and trailing function digits are entered at a standard POTS telephone to select features of a cellular terminal. Other systems employ an End Of Number (EON) key method, in which the user explicitly decides when to send dialed digits to the cellular terminal by pressing a predetermined key. For example, U.S. Pat. No. 5,117,450 to Joglekar et al. discusses pressing "#" or "*" to send dialed digits to a cellular transceiver. A drawback of such systems is that they require the user to press a particular function key or key sequence, which can be cumbersome and easily forgotten.

Another proposed solution is a Digit by Digit method, in which a certain number of roamer ports are assigned in the MSC for the FCT subscribers. When a POTS telephone goes off hook, a call to one of the roamer ports in the MSC is automatically performed via an FCT. When a voice or traffic channel is assigned to the calling FCT, the MSC generates a dial tone that is sent to the FCT through the voice or traffic channel. The user then initiates dialing, and the dialed digits are sent as dual tone multi-frequency (DTMF) tones through the voice or traffic channel to the MSC. These dialed digits are stored in the roamer port, forming the complete called number. A problem with this approach is that it requires a change in the configuration of existing MSCs or the installation of new MSCs, which can be prohibitively expensive.

Thus, it is an objective of the present invention to provide an improved method and apparatus for setting up a call between at least one standard analog terminal and a remote terminal in a network, via a radio terminal, which overcomes the drawbacks mentioned above.

SUMMARY

According to a first embodiment of this invention, a method and apparatus are provided for setting up a call between at least one standard analog terminal and a remote terminal in a network via a radio terminal. The contents of a memory are cleared, and a first dialed digit is received from the standard analog terminal. The radio terminal is instructed to terminate call set up processing. The first dialed digit is stored in the memory, forming the contents of the memory. A number representing the remote terminal is formed comprising the contents of the memory. The radio terminal is instructed to initiate call set up processing using the number. If a subsequently dialed digit is received from the standard analog terminal, then the radio terminal is instructed to terminate call set up processing. The subsequently dialed digit is stored in the memory, together with the contents of the memory, to form updated contents. A new number is formed comprising the updated contents of the memory, and the radio terminal is instructed to initiate call set up processing using the new number. The steps of receiving a subsequently dialed digit, instructing the radio terminal to terminate call set up processing, storing the subsequently dialed digit in the memory, together with the contents of the memory, to form updated contents, forming a new number comprising the updated contents, and instructing the radio terminal to initiate call set up processing using the new number are repeated for each subsequently dialed digit, as long as the subsequently dialed digit is received before a call set up request is sent to the network.

According to another aspect of the first embodiment of this invention, a method and apparatus are provided for accessing a remote terminal or requesting a service in a network from at least one standard analog terminal via a radio terminal, while the radio terminal is engaged in a conversation with another remote terminal in the network. A register recall indication is received from the standard analog terminal, and the contents of a memory are cleared. The radio terminal is then instructed to terminate flash access preparation. Next, the radio terminal is instructed to initiate flash access preparation with no dialed digits. If a first dialed digit is received from the standard analog terminal, then the radio terminal is instructed to terminate flash access preparation, and the first dialed digit is stored in the memory, forming the contents of the memory. A number representing the remote terminal or a requested service is formed comprising the contents of the memory. The radio terminal is instructed to initiate flash access preparation using the number. If a subsequently dialed digit is received from the standard analog terminal, then the radio terminal is instructed to terminate flash access preparation. The subsequently dialed digit is stored in the memory, together with the contents of the memory, to form updated contents. A new number is formed comprising the updated contents of the memory, and the radio terminal is instructed to initiate flash access preparation using the new number. The steps of receiving a subsequently dialed digit, instructing the radio terminal to terminate flash access preparation, storing the subsequently dialed digit in the memory, together with the contents of the memory, to form updated contents, forming a new number comprising the updated contents, and instructing the radio terminal to initiate flash access preparation using the new number are repeated for each subsequently dialed digit, as long as the subsequently dialed digit is received before a flash request is sent to the network.

According to a second embodiment of this invention, a method and apparatus are provided for setting up a call between at least one standard analog terminal and a remote terminal in a network via a radio terminal. The contents of a memory are cleared, and a first dialed digit is received from the standard analog terminal. Verification of the radio terminal status is terminated, if it is in progress, and the first dialed digit is stored in the memory, forming the contents of the memory. Verification of the radio terminal status includes, for example, sampling and evaluation of the radio signal strength, determining the service restrictions of the radio terminal, determining whether the radio terminal is authorized to make a call from the cell in which it is located, and determining whether an operator's Subscriber Interface Module (SIM) card is allowed. Verification of the radio terminal status is initiated, either on demand or periodically, and the contents of the memory are sent to a buffer. If a subsequently dialed digit is received from the standard analog terminal, verification of the radio terminal status is terminated, and the subsequently dialed digit is stored in the memory, together with the contents of the memory, to form updated contents. Verification of the radio terminal status is initiated, and the updated contents are sent to the buffer. When the verification of the radio terminal status is completed, and the radio terminal is determined to be ready for call set up, the updated contents are sent from the buffer to the radio terminal with an instruction to begin call set up processing is initiated. The steps of receiving a subsequently dialed digit, terminating radio terminal status verification, storing the subsequently dialed digit in the memory, together with the contents of the memory, to form updated contents, initiating radio terminal status verification, and sending the updated contents to the buffer are repeated for each subsequently dialed digit, as long as the subsequently dialed digit is received from the standard analog terminal before call set up processing is initiated.

According to a third embodiment of this invention, a method and apparatus are provided for setting up a call between at least one standard analog terminal and a remote terminal in a network via a radio terminal and a radio base station. The contents of a memory are cleared, and a first dialed digit is received from the standard analog terminal. Verification of the radio terminal status is terminated, if it is in progress, and the first dialed digit is stored in the memory, forming the contents of the memory. The contents of the memory are sent to a buffer, and verification of the radio terminal status is initiated, either on demand or periodically. If a subsequently dialed digit is received from the standard analog terminal, verification of the radio terminal status is terminated, and the subsequently dialed digit is stored in the memory, together with the contents of the memory, to form updated contents. The updated contents are sent to the buffer, and verification of the radio terminal status is initiated. When the verification of the radio terminal status is completed, and the radio terminal is determined to be ready for call set up, a request for call setup is sent from the radio terminal to a radio base station. The steps of receiving a subsequently dialed digit, terminating radio terminal status verification, storing the subsequently dialed digit in the memory, together with the contents of the memory, to form updated contents, initiating radio terminal status verification, and sending the updated contents to the buffer are repeated for each subsequently dialed digit, as long as the subsequently dialed digit is received from the standard analog terminal before the request for call set up is sent from the radio terminal to the radio base station.

BRIEF DESCRIPTION OF THE DRAWINGS

Exemplary embodiments of the invention will now be described in more detail with reference to the accompanying drawings, in which like descriptive labels are used to refer to similar elements.

DETAILED DESCRIPTION

In the following description, for purposes of explanation and not limitation, specific details are set forth, such as particular circuits, circuit components, techniques, etc., in order to provide a thorough understanding of the invention. However, it will be apparent to one of ordinary skill in the art that the present invention may be practiced in other embodiments that depart from these specific details. In other instances, detailed descriptions of well-known methods, devices, and circuits are omitted so as not to obscure the description of the present invention with unnecessary detail.

Figure 1:
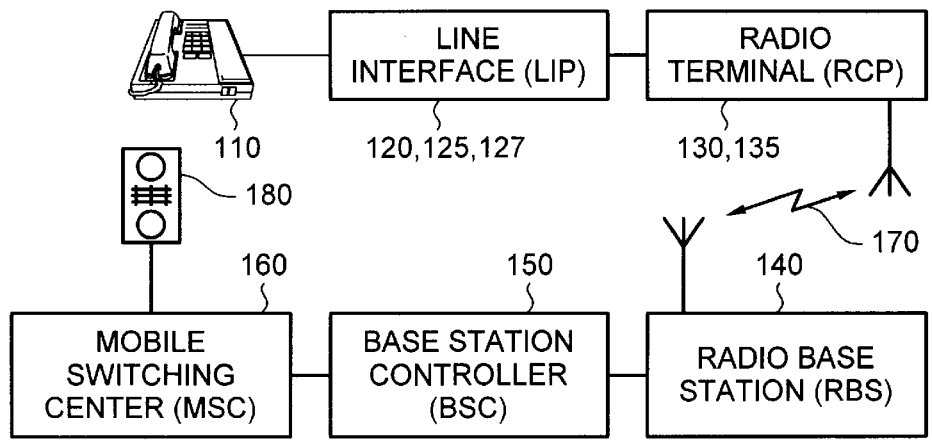
FIG. 1 is a functional block diagram illustrating an exemplary interconnection between a POTS telephone and a cellular radio communication system.

FIG. 1 is a functional block diagram illustrating an exemplary interconnection between a POTS telephone and a cellular radio communication system. A Line Interface Processor (LIP) 120, 125, 127 provides an interface between a POTS telephone 110 and a Radio Terminal (RCP) 130, 135. The LIP can be implemented, for example, as a device 120 shown in FIG. 2, a device 125 shown in FIG. 6, or a device 127 shown in FIG. 10. The RCP can also be implemented with a variety of devices, e.g., the device 130 shown in FIGS. 2 and 6 or the device 135 shown in FIG. 10. Only one POTS telephone 110 is shown in FIG. 1 for ease of illustration. However, any number of POTS telephones can be connected to the LIP 120, 125, 127. The POTS telephone 110 is illustrated in FIG. 1 as one example of a standard analog terminal. Although not shown, the present invention is applicable to any type of terminal, e.g., a facsimile terminal, a modem, or an Integrated Services Digital Network (ISDN) terminal.

The LIP 120, 125, 127 and the RCP 130, 135 form an FCT. While shown as separate functional blocks for simplicity, the LIP 120, 125, 127 and the RCP 130, 135 can be included in a single device. Additionally, all or some of the functions provided by the LIP 120, 125, 127 can, alternately, be performed by the RCP 130, 135.

Speech and data are transmitted between the RCP 130, 135 and the POTS telephone 110 via the LIP 120, 125, 127. The RCP 130, 135 in turn, transmits and receives data and speech to and from a remote terminal 180 in a network via a radio air interface 170, a RBS 140, a BSC 150, and a MSC 160. The RCP 130, 135 periodically performs radio signal strength (RSS) measurements of various radio channels, including, for example, the control channel across which the RBS 140 transmits control data to the RCP 130, 135. The remote terminal 180 can be any type of terminal in any type of telecommunication network. Although only one remote terminal 180 is shown in FIG. 1, the present invention is applicable to any number of remote terminals.

Figure 2:
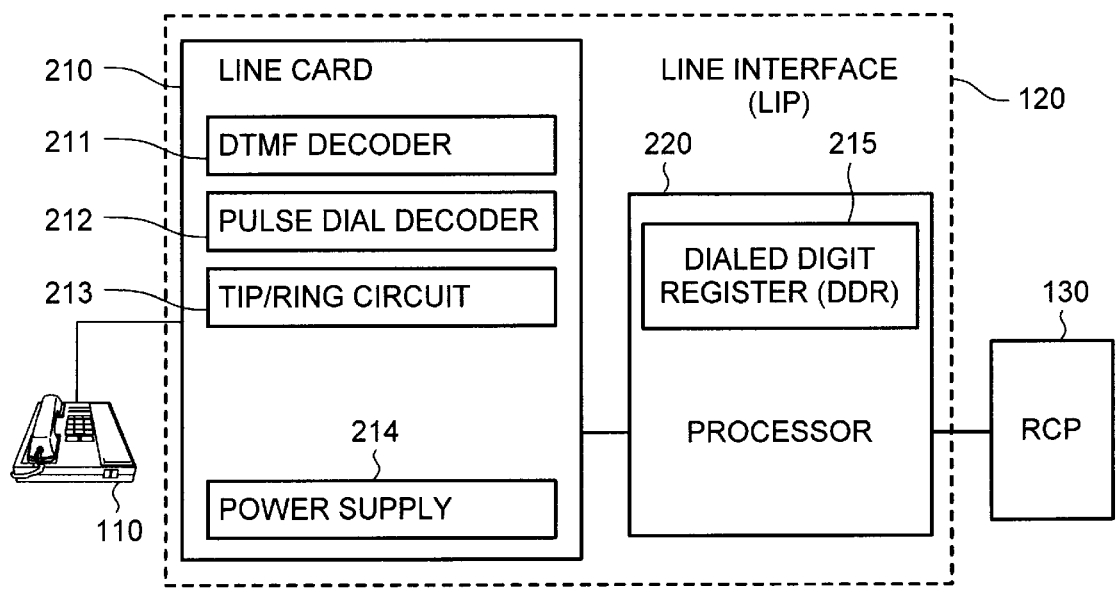
FIG. 2 is a functional block diagram illustrating details of a line interface processor according to a first embodiment of the present invention.

FIG. 2 illustrates details of the LIP 120 according to a first embodiment of the present invention. The LIP 120 is suited for enabling communication in an analog network. The LIP 120 comprises a Line Card 210 and a Processor 220. Although shown as separate devices, the LIP 120 and the Processor 220 can be included in a single device.

The Line Card 210 includes a DTMF Decoder 211 for receiving and decoding dialed digits in the form of DTMF tones corresponding to specific keys pressed on the POTS telephone 110. The Line Card 210 also includes an optional Pulse Dial Decoder 212 to accommodate analog rotary telephone terminals. The Line Card 210 further includes a Tip/Ring circuit 213 which sends a ring signal to the POTS telephone 110 in response to an incoming call from the RCP 130 and monitors the hook switch status of the POTS telephone 110 to detect when the POTS telephone goes on or off hook. The Line Card 210 also includes a Power Supply 214 which provides DC power to the POTS telephone 110.

The Processor 220 receives dialed digits from the Line Card 210 and stores each dialed digit in a Dialed Digits Register (DDR) 215. As each dialed digit is received, it is appended to dialed digits previously stored in the DDR 215. Although shown as part of the Processor 220, the DDR 215 can be implemented as a separate device. Also, the DDR 215 is shown as an example of a storage device, and the dialed digits can be stored in any type of memory.

The Processor 220 also sends and receives messages to the RCP 130 regarding call setup and flash access preparation, retrieves stored dialed digits from the DDR 215, and transmits the stored dialed digits to the RCP 130. The Processor 220 can be implemented with, for example, a conventional programmable microprocessor.

Figure 3A:
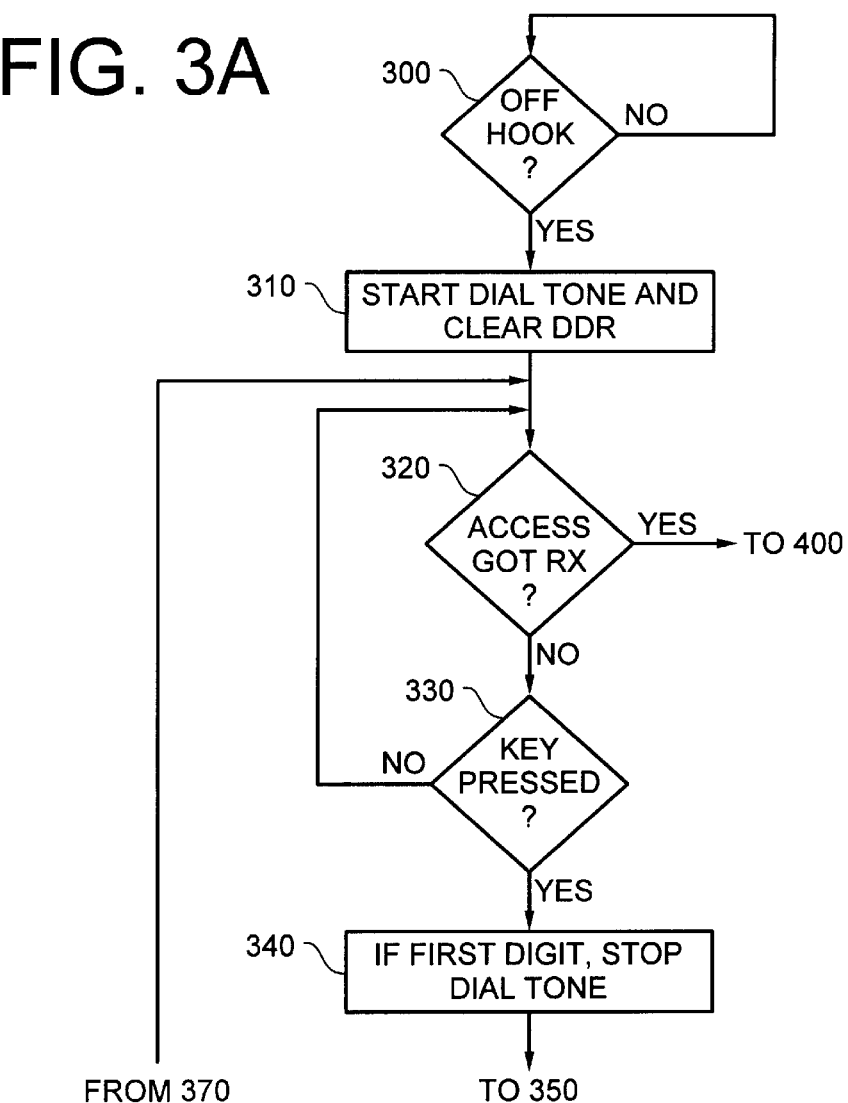
FIG. 3A is a flowchart illustrating an exemplary dialed digit transfer process when the RCP is initially in an idle state according to the first embodiment of the present invention.

FIG. 3A illustrates an exemplary dialed digit transfer process performed by the Processor 220 when the RCP 130 is initially in an idle state according to the first embodiment of the present invention. The process begins at step 300 at which the Line Card 210 monitors the hook switch status of the POTS telephone 110 to determine if the POTS telephone is off-hook. If the POTS telephone 110 is determined not to be off-hook, step 300 is repeated, and the Line Card 210 continues monitoring the hook switch status. When the Line Card 210 determines that the POTS telephone 110 is off-hook, for example because the subscriber has lifted the receiver, the process proceeds to step 310 at which the Line Card 210 provides a dial tone to the POTS telephone 110 and sends an off-hook indication to the Processor 220. Upon receipt of the off-hook indication, the Processor 220 clears the DDR 215.

Next, at step 320, the Processor 220 determines whether the RCP 130 has transmitted an 'ACCESS GOT' message, indicating that system access has been established, and no more digits will be accepted from the POTS telephone 110. The 'ACCESS GOT' message is sent after the RCP 130 has completed call set up processing, or at least has reached a point during processing after which dialed digits cannot be accepted, i.e., a "point of no return" at which the RCP 130 has begun to transmit a request for call set up on an uplink control channel to the network.

Figure 3B:
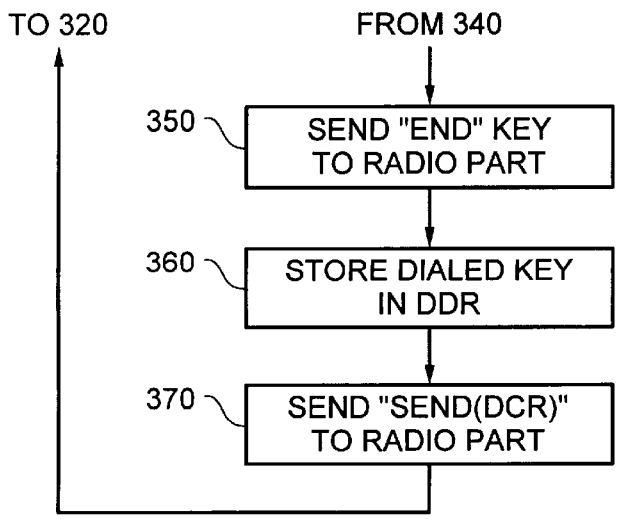
FIG. 3B is a flowchart illustrating an exemplary END-STORE-SEND routine when the RCP is initially in an idle state according to the first embodiment of the present invention.
Figure 4A:
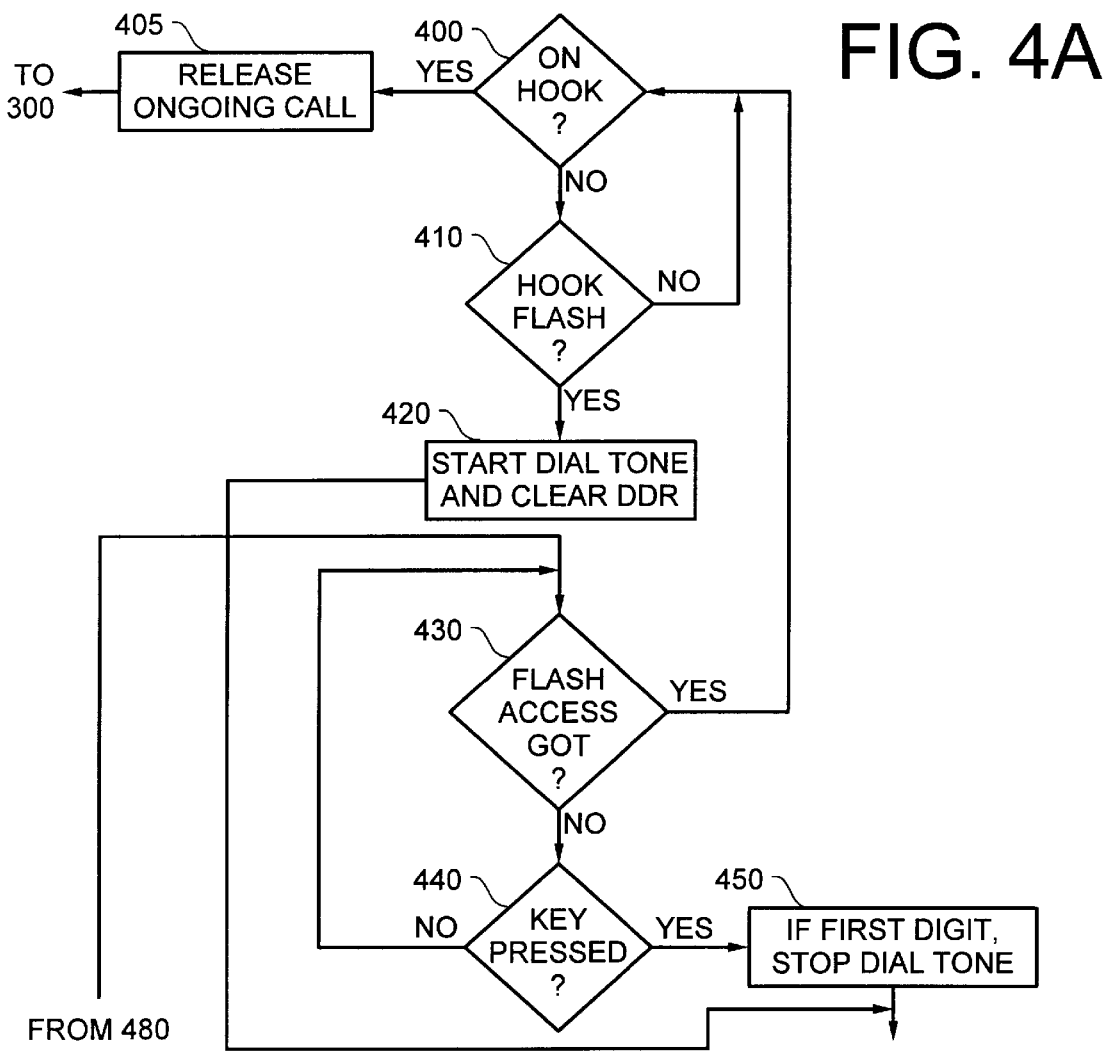
FIG. 4A is a flowchart illustrating an exemplary register recall process when the RCP is initially in a conversation state according to the first embodiment of the present invention.

If the Processor 220 determines that an 'ACCESS GOT' message has been received, the process proceeds to step 400 shown in FIG. 4A. If the Processor 220 determines that an 'ACCESS GOT' message has not been received, the Line Card 210 next detects whether a DTMF tone (or, alternately, a pulsed-dial signal) has been received, indicating that a key on the POTS telephone 110 has been pressed (step 330). If a key has not been pressed, the process returns to step 320. If a key has been pressed, the process proceeds to step 340. At step 340, the dial tone is stopped if the key pressed corresponds to a first digit dialed. The DTMF Decoder 211 determines which key was pressed (i.e., which digit was dialed) and presents the dialed digit to the Processor 220. When the Processor 220 receives the dialed digit, the Processor executes the END-STORE-SEND routine shown in FIG. 3B.

Referring to FIG. 3B, the END-STORE-SEND routine begins at step 350 at which the Processor 220 sends an 'END' message to the RCP 130, instructing the RCP to discontinue call set up processing. The first time this message is received, the RCP 130 is not executing call set up processing, and thus the RCP ignores the instruction.

After the 'END' message is sent, the process proceeds to step 360 at which the Processor 220 stores the dialed digit in the DDR 215. For the first dialed digit, the DDR 215 is empty. Each consecutively dialed digit is appended to the dialed digits previously stored in the DDR 215. Next, at step 370, the stored dialed digits are fetched from the DDR 215, and a 'SEND' message is transmitted to the RCP 130, the 'SEND' message instructing the RCP 130 to initiate call set up processing and containing the stored dialed digits. From there, the process returns to step 320 in FIG. 3A.

Upon receipt of the 'SEND' message, the RCP 130 initiates call set up processing, which is performed according to known techniques suited to the particular air interface standard employed in the cellular system. In general, call set up processing begins by scanning for available control channels broadcast by the RBS 140 and decoding overhead information. During call set up processing, the RCP 130 continuously monitors the LIP 120 to determine whether an 'END' message has been transmitted by the LIP 120. If an 'END' message has been transmitted by the LIP 120, the RCP 130 terminates the call set up processing.

FIG. 4A illustrates an exemplary register recall process performed by the Processor 220 when the RCP 130 is initially in a conversation state. The process begins at step 400 at which the Line Card 210 monitors the hook switch status of the POTS telephone 110 to determine if the POTS telephone is on-hook. If the POTS telephone 110 is determined to be on-hook, the Processor 220 instructs the RCP 130 to release the ongoing call at step 405, and the process proceeds to step 300 in FIG. 3A. If the POTS telephone 110 is determined not to be on-hook, the process proceeds to step 410 at which the Line Card 210 determines whether a hook flash has been received from the POTS telephone 110 indicating that a register recall has been requested to invoke a special service, e.g, a third party conference call or acceptance of a waiting call. If a hook flash has not been received, the process returns to step 400. If a hook flash has been received, the process proceeds to step 420 at which the Line Card 210 provides a dial tone to the POTS telephone 110 and sends a register recall indication to the Processor 220. Upon receipt of the register recall indication, the Processor 220 clears the DDR 215 and executes the END-STORE-SEND routine shown in FIG. 4B, as explained below, with no dialed digits. That is, the Processor 220 transmits an 'END FLASH' message to the RCP 130, instructing the RCP 130 to end flash access preparation. The first time this message is received, the RCP 130 is not executing flash access preparation, and thus the RCP ignores the instruction. Then, the Processor 220 transmits a 'SEND FLASH' message containing no digits to the RCP 130, instructing the RCP to initiate flash access preparation.

Next, at step 430 the Processor 220 determines whether a 'FLASH ACCESS GOT' message has been received from the RCP 130 indicating that flash access has been established, and no more digits will be accepted from the POTS telephone 110. The 'FLASH ACCESS GOT' message is sent after the RCP 130 has reached a point during flash access preparation after which dialed digits will not be accepted, i.e., a "point of no return" at which the RCP has begun to transmit a flash request to the network.

If the Processor 220 determines that a 'FLASH ACCESS GOT' message has been received, the process returns to step 400. If the Processor 220 determines that a 'FLASH ACCESS GOT' message has not been received, the Line Card 210 next detects whether a DTMF tone (or, alternately, a pulsed-dial signal) has been received, indicating that a key on the POTS telephone 110 has been pressed (step 440). If a key has not been pressed, the process returns to step 430. If a key has been pressed, the process proceeds to step 450. At step 450, the dial tone is stopped, if the key pressed corresponds to a first digit dialed. The DTMF decoder 211 determines which key was pressed (i.e., which digit was dialed), and the dialed digit is presented to the Processor 220. When the Processor 220 receives the dialed digit, the Processor executes the END-STORE-SEND routine shown in FIG. 4B.

Figure 4B:
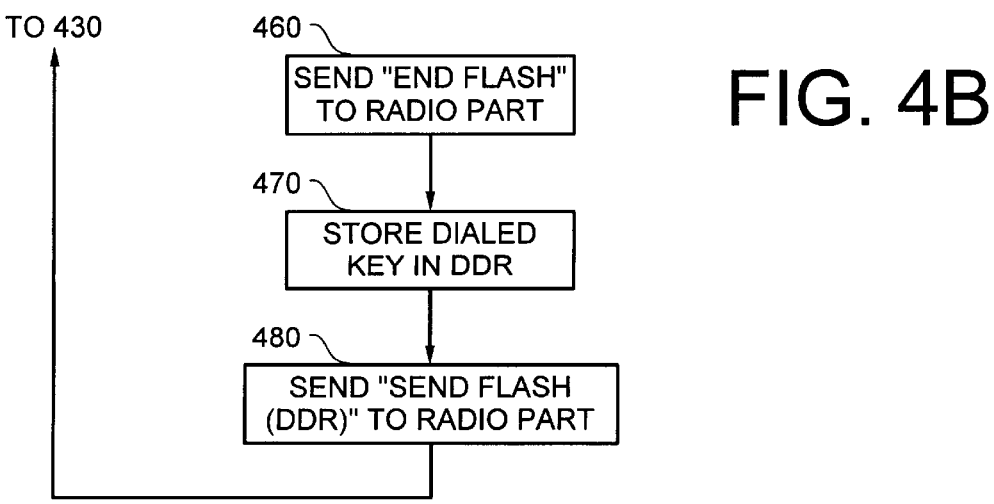
FIG. 4B is a flowchart illustrating an exemplary END-STORE-SEND routine when the RCP is initially in a conversation state according to the first embodiment of the present invention.

Referring to FIG. 4B, the Processor 220 first sends an 'END FLASH' message to the RCP 130 at step 460. The 'END FLASH' message instructs the RCP 130 to discontinue flash access preparation.

After the 'END FLASH' message is sent, the process proceeds to step 470 at which the Processor 220 stores the dialed digit in the DDR 215. The dialed digit is appended to dialed digits previously stored in the DDR 215. Next, at step 480, the stored dialed digits are fetched from the DDR 215, and a 'SEND FLASH' message is transmitted to the RCP 130, the 'SEND FLASH' message instructing the RCP 130 to initiate flash access preparation and containing the stored dialed digits. From there, the process returns to step 430 in FIG. 4A.

Figures 1, 5A:
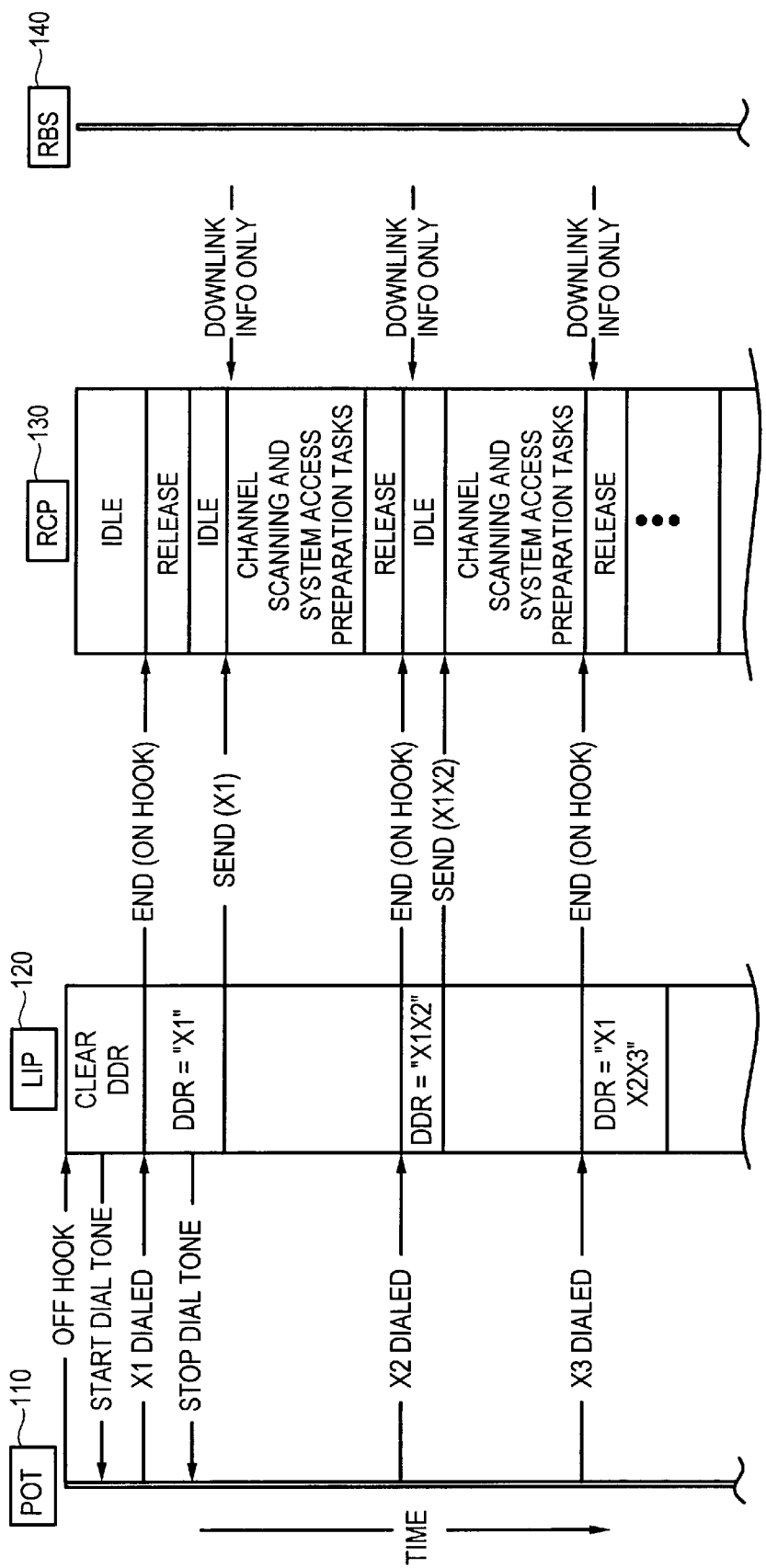
FIG. 5A illustrates an exemplary process for setting up a call using the END-STORE-SEND routine when the RCP is initially in an idle state according to the first embodiment of the present invention.
Figures 2, 5A:
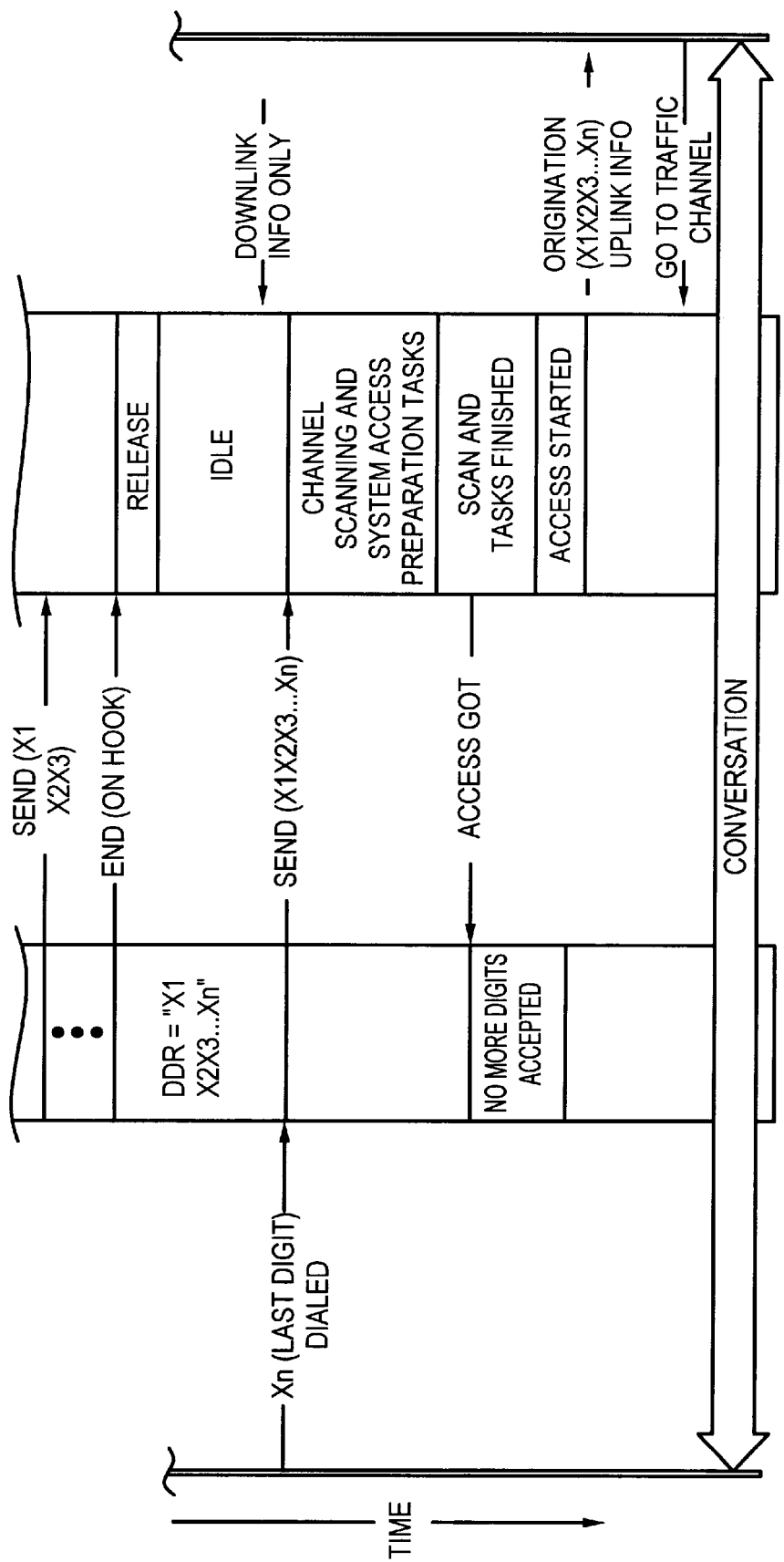
Figures 1, 5B:
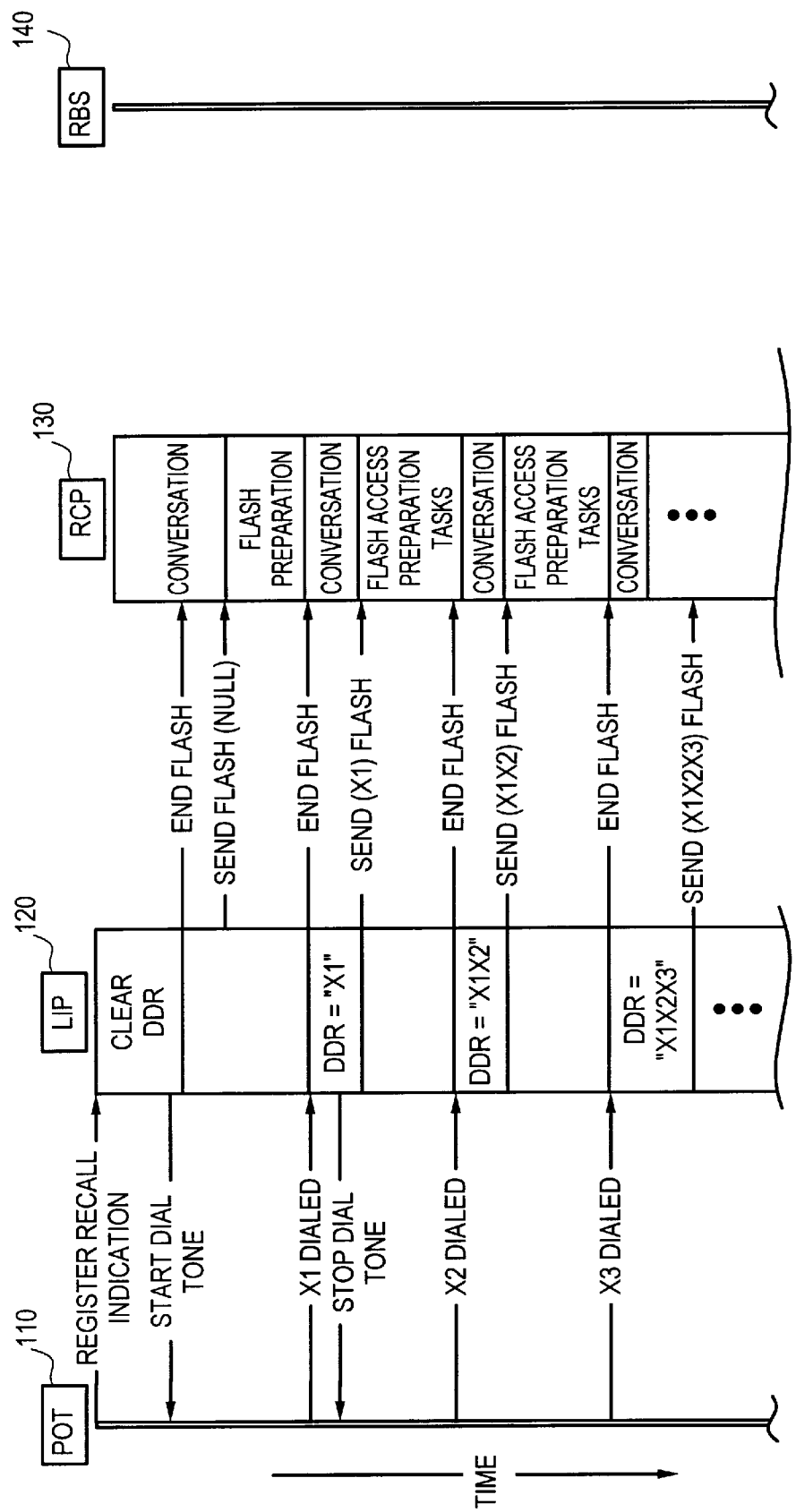
FIG. 5B illustrates an exemplary process for accessing a remote terminal or requesting a special service using the END-STORE-SEND routine when the RCP is initially in a conversation state according to the first embodiment of the present invention.
Figures 2, 5B:
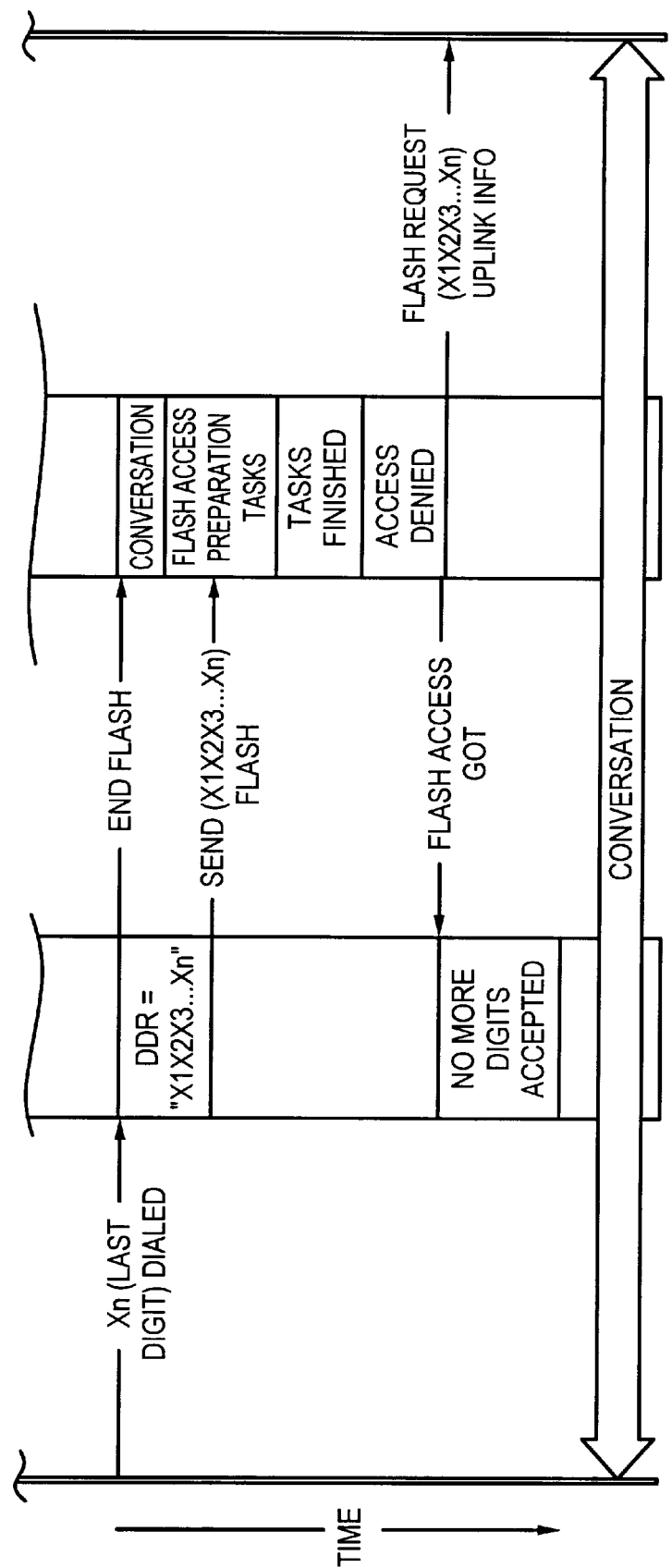

FIGS. 5A and 5B illustrate how the END-STORE-SEND routine is used to set up a call and to access a remote terminal or request a service, respectively, via a radio terminal, according to the first embodiment of the present invention. The processes in FIGS. 5A and 5B are both represented on a time axis.

Referring to FIG. 5A, a process for setting up a call when the RCP 130 is initially in an idle state begins with the POTS telephone 110 indicating to the LIP 120 that it has gone off hook. The LIP 120 clears the DDR 215 and provides a dial tone to the POTS telephone 110. At this point, dialing has not initiated yet, and the RCP 130 remains idle.

Next, the POTS telephone 110 transmits a first dialed digit, X1, to the LIP 120. The LIP 120 stops the dial tone and sends an 'END' message to the RCP 130. The RCP 130 releases, i.e., terminates call set up processing if it is in progress, and returns to the idle state. While the RCP 130 is releasing, the LIP 120 stores the dialed digit, X1, in the DDR 215. Next, the LIP 120 transmits a 'SEND' message to the RCP 130, the 'SEND' message instructing the RCP 130 to initiate call set up processing and containing the dialed digit, X1. During this time, information is only transmitted across a downlink control channel from the RBS 140 to the RCP 130. Upon receipt of the 'SEND' message containing the dialed digit, X1, from the LIP 120, the RCP 130 performs call set up processing including channel scanning and system access preparation tasks.

Next, another digit, X2, is dialed and transmitted by the POTS telephone 110 to the LIP 120. Again, the LIP 120 sends an 'END' message to the RCP 130, and the RCP 130 releases and returns to the idle state. While the RCP 130 is releasing, the LIP 120 stores the dialed digit, X2, in the DDR 215, appending it to the previously stored dialed digit, X1. Next, the LIP 120 sends another 'SEND' message to the RCP 130, the 'SEND' message instructing the RCP 130 to initiate call set up processing and containing the stored dialed digits, X1X2. The RCP 130 continues only to receive information across a downlink control channel from the RBS 140. Next, the RCP 130 performs call set up processing.

This process is repeated for the next digit, X3, through a dialed digit, XN. After receipt of the 'SEND' message containing the dialed digits, X1X2X3 . . . XN, the RCP 130 sends a call set up request to the network. The RCP 130 sends an 'ACCESS GOT' message to the LIP 120 and an 'ORIGINATION' message containing the dialed digits X1X2X3 . . . XN across an uplink control channel to the RBS 140. At this point, the LIP 120 stops accepting digits from the POTS telephone 110. The RBS 140 assigns a traffic channel, if available, and the conversation proceeds across the assigned traffic channel.

FIG. 5B illustrates an exemplary process for accessing a remote terminal or requesting a service when the RCP 130 is initially in a conversation state according to the first embodiment of the present invention. The process begins with the POTS telephone 110 indicating to the LIP 120 that it has detected a register recall indication, e.g., in response to the subscriber putting the receiver on hook for a short period of time or pressing an "R" key. The LIP 120 clears the DDR 215 and provides a dial tone to the POTS telephone 110. Next, the LIP 120 sends an 'END FLASH' instruction to the RCP 130 and then sends a 'SEND FLASH' message to the RCP 130 with no dialed digits, and the RCP 130 prepares for flash access.

Next, the POTS telephone 110 transmits a first dialed digit, X1, to the LIP 120. The LIP 120 stops the dial tone and sends an 'END FLASH' message to the RCP 130. The LIP 120 stores the dialed digit, X1, in the DDR 215. Next, the LIP 120 transmits a 'SEND FLASH' message to the RCP 130, the 'SEND FLASH' message instructing the RCP 130 to initiate flash access preparation and containing the first dialed digit, X1. Upon receipt of the 'SEND FLASH' message containing the dialed digit, X1, from the LIP 120, the RCP 130 prepares for flash access.

Next, another digit, X2, is dialed and transmitted by the POTS telephone 110 to the LIP 120. Again, the LIP 120 transmits an 'END FLASH' message to the RCP 130. The LIP 120 stores the dialed digit, X2, in the DDR 215, appended to the previously dialed digit, X1. Next, the LIP 120 transmits a 'SEND FLASH' message to the RCP 130, the 'SEND FLASH' message instructing the RCP 130 to initiate flash call set up processing and containing the stored dialed digits, X1X2. Next, the RCP 130 prepares for flash access.

This process is repeated for the next digit, X3, through a dialed digit, XN. After receipt of the 'SEND FLASH' message containing the dialed digits X1X2X3 . . . XN, the RCP 130 sends a 'FLASH ACCESS GOT' message to the LIP 120 and a 'FLASH REQUEST' message containing the dialed digits, X1X2X3 . . . XN, to the RBS 140 across the existing traffic channel. At this point the LIP 120 stops accepting digits from the POTS telephone 110, and the RBS 140 passes the 'FLASH REQUEST' message to the network. The action taken by the network depends on the service requested.

While the examples illustrated in FIG. 5A and FIG. 5B describe dialed digits X1X2X3 . . . XN for purposes of illustration, it should be understood that the present invention is applicable to zero, one, or any number of dialed digits.

The first embodiment of the invention is suited for analog networks. Examples of networks in which the first embodiment of the present invention can be employed are ETACS and AMPS networks. In these networks, call set up processing includes a channel scanning stage during which the RCP 130 analyzes every channel in the set of control channels. The time needed to handle this task, as recommended by the network specification, ranges roughly between 1.5 and 3 seconds, but this time can be extended to 3 to 6 seconds or even longer. During this time, if the RCP 130 receives an 'END' message, the RCP returns to the initial idle state until another 'SEND' message is received to initiate call set up processing. There is ample time available for dialing between each digit.

The first embodiment is less well suited for digital networks such as GSM, D-AMPS, or PDC networks because call setup processing in such networks occurs so rapidly that a user may not have enough time to dial the next digit of a desired number before call setup processing is completed.

Accordingly, a second embodiment of the present invention solves this problem by modifying the conventional RCP 130 such that useful operations are performed while the dialing tasks are running on the LIP 125 so that the RCP 130 is prepared for starting call setup. For example, the status of the RCP 130 is verified while dialing tasks are running on the LIP 125.

Figure 6:
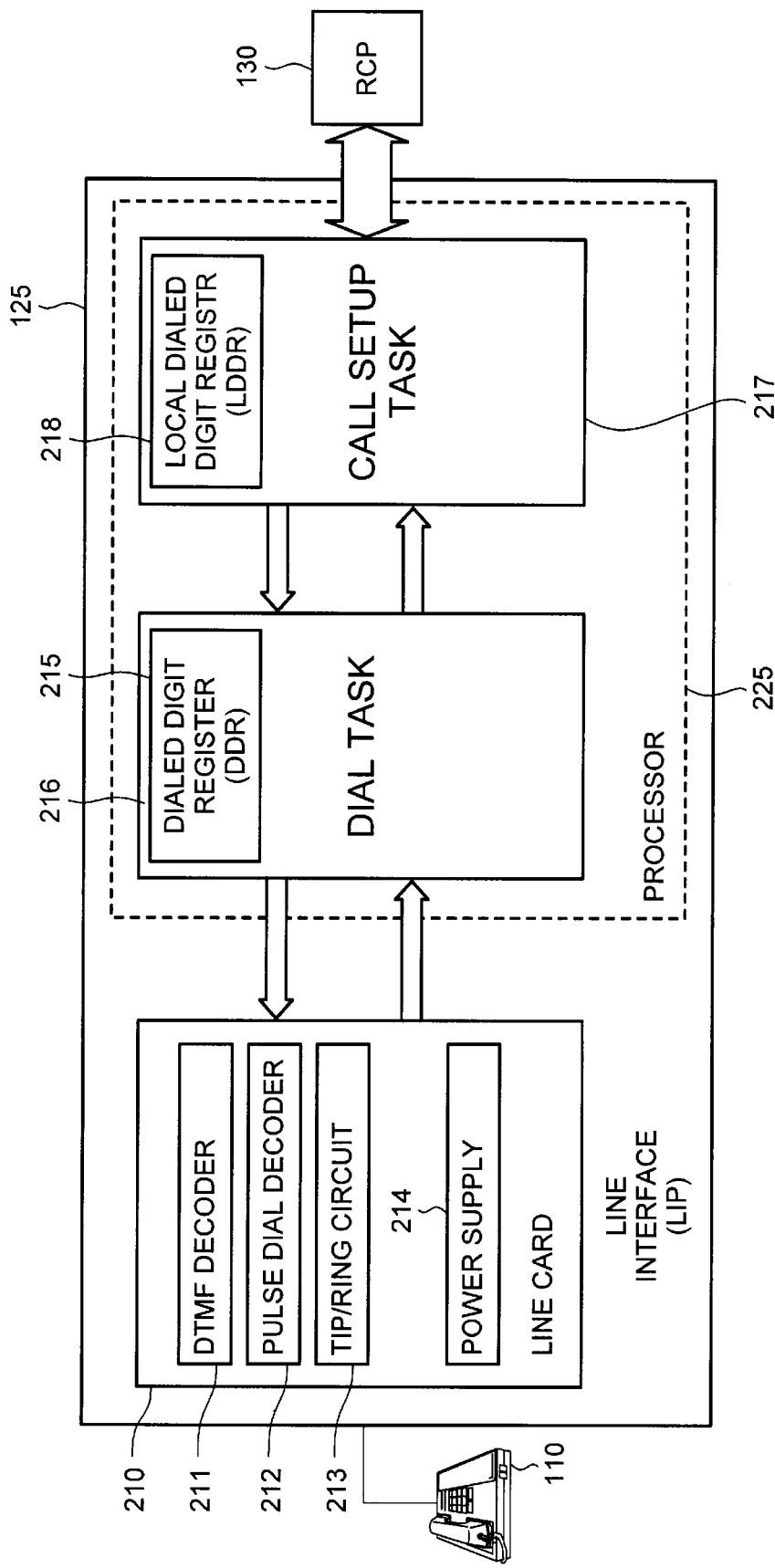
FIG. 6 is a functional block diagram illustrating details of a line interface processor according to a second embodiment of the present invention.

FIG. 6 illustrates details of the LIP 125 according to the second embodiment of the present invention. The LIP 125 is suited for enabling communication in a digital network. The LIP 125 contains similar features as the LIP 120 illustrated in FIG. 2, including a Line Card 210 and a Processor 225. The Processor 225 differs from the Processor 220 in that it includes a Dial Task 216 and a Call Setup Task 217. A Dialed Digit Register (DDR) 215 is included in the Dial Task 216, and a Local Dialed Digit Register (LDDR) 218 is included in the Call Setup Task 217. Although shown as part of the LIP 125 for ease of illustration and description, the Call Setup Task 217 can also be distributed between the LIP 125 and the RCP 130.

The Dial Task 216 receives dialed digits from the Line Card 210 and stores each dialed digit in the DDR 215. The dialed digits are appended to dialed digits previously stored in the DDR 215. The Dial Task 216 also retrieves stored dialed digits from the DDR 215, and sends the stored dialed digits to the LDDR 218.

The Call Setup Task 217 communicates with the Dial Task 216 and the RCP 130 regarding RCP status verification and call setup processing. Also, the Call Setup Task 217 sends dialed digits from the LDDR 218 to the RCP 130. The Dial Task 216, Call Setup Task 217, and other features of the Processor 225 can be implemented, for example, with a conventional programmable microprocessor running a multitasking application configured around a standard or specially configured real time operating system.

Figure 7A:
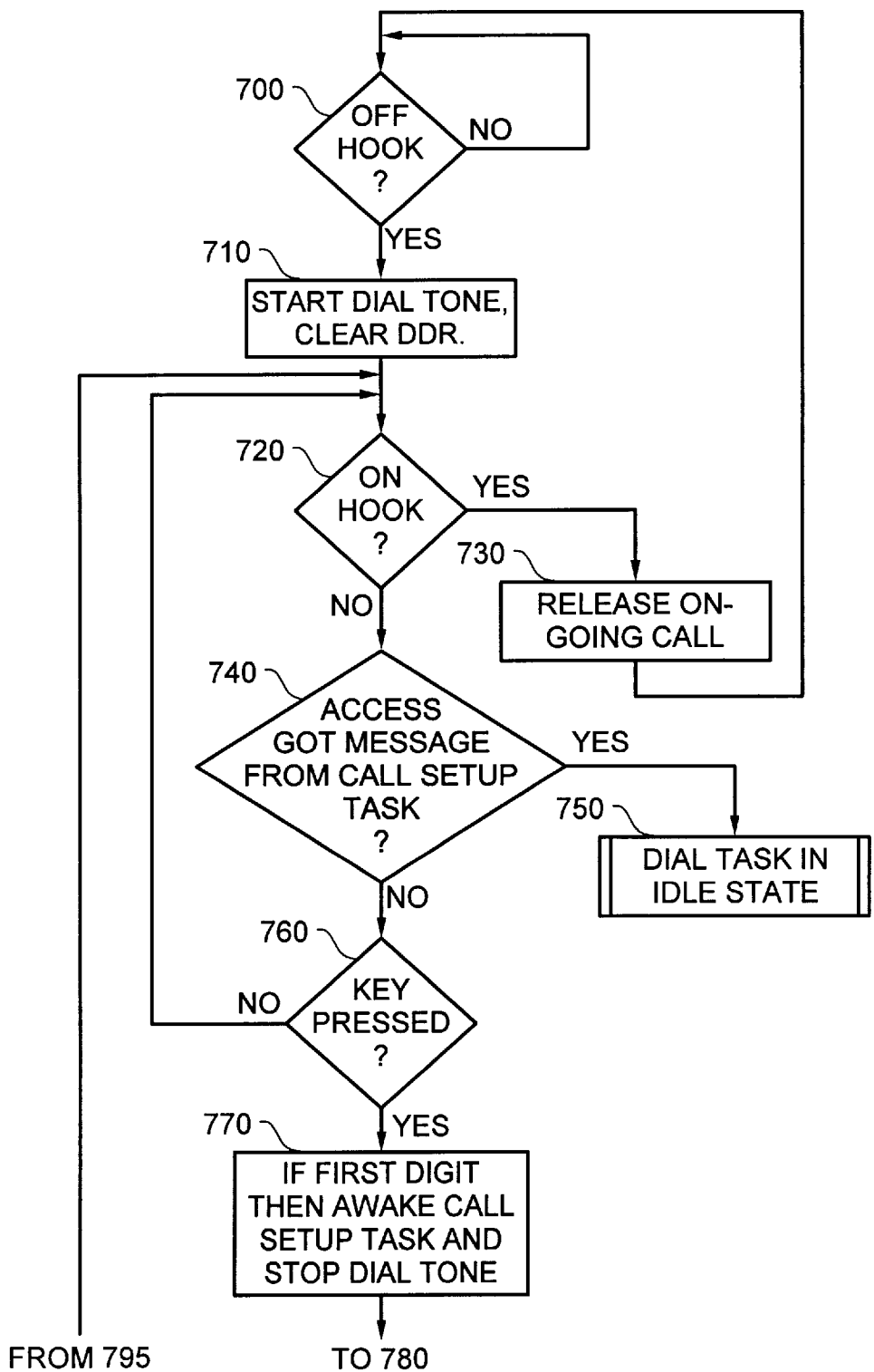
FIG. 7A is a flowchart illustrating an exemplary dialed digit transfer process according to the second embodiment of the present invention.

FIG. 7A illustrates an exemplary dialed digit transfer process when the RCP 130 is initially in an idle state according to the second embodiment of the present invention. The process begins at step 700 at which the Line Card 210 monitors the hook switch status of the POTS telephone 110 to determine if the POTS telephone is off-hook. If the POTS telephone 110 is determined not to be off-hook, step 700 is repeated, and the Line Card 210 continues monitoring the hook switch status. When the Line Card 210 determines that the POTS telephone 110 is off-hook, for example because the subscriber has lifted the receiver, the process proceeds to step 710 at which the Line Card 210 provides a dial tone to the POTS telephone 110 and sends an off-hook indication to the Dial Task 216. Upon receipt of the off-hook indication, the Dial Task 216 clears the DDR 215.

Next, at step 720, a determination is made whether the POTS telephone 110 has gone on-hook, e.g., because the subscriber has hung up. If the POTS telephone 110 has gone on-hook, the ongoing call is released at step 730, if there is one, and the process returns to step 700. If the POTS telephone 110 is not on-hook, the process proceeds to step 740 at which the Dial Task 216 determines whether the Call Setup Task 217 has transmitted an 'ACCESS GOT' message, indicating that a request to begin call setup processing has been sent to the RCP 130 from the Call Setup Task 217, and no more digits will be accepted from the POTS telephone 110.

If the Dial Task 216 determines that an 'ACCESS GOT' message has been received, the Dial Task 216 is put in an idle state at step 750. If the Dial Task 216 determines that an 'ACCESS GOT' message has not been received, the Line Card 210 next detects whether a DTMF tone (or, alternately, a pulsed-dial signal) has been received, indicating that a key on the POTS telephone 110 has been pressed (step 760). If a key has not been pressed, the process returns to step 720. If a key has been pressed, the process proceeds to step 770. At step 770, the Call Setup Task 217 is awakened, and the dial tone is stopped, if the key pressed corresponds to a first digit dialed. The DTMF Decoder 211 determines which key was pressed (i.e., which digit was dialed) and presents the dialed digit to the Dial Task 216. When the Dial Task 216 receives the dialed digit, the END-STORE-VERIFY RCP STATUS-SEND routine shown in FIG. 7B is executed.

Figure 7B:
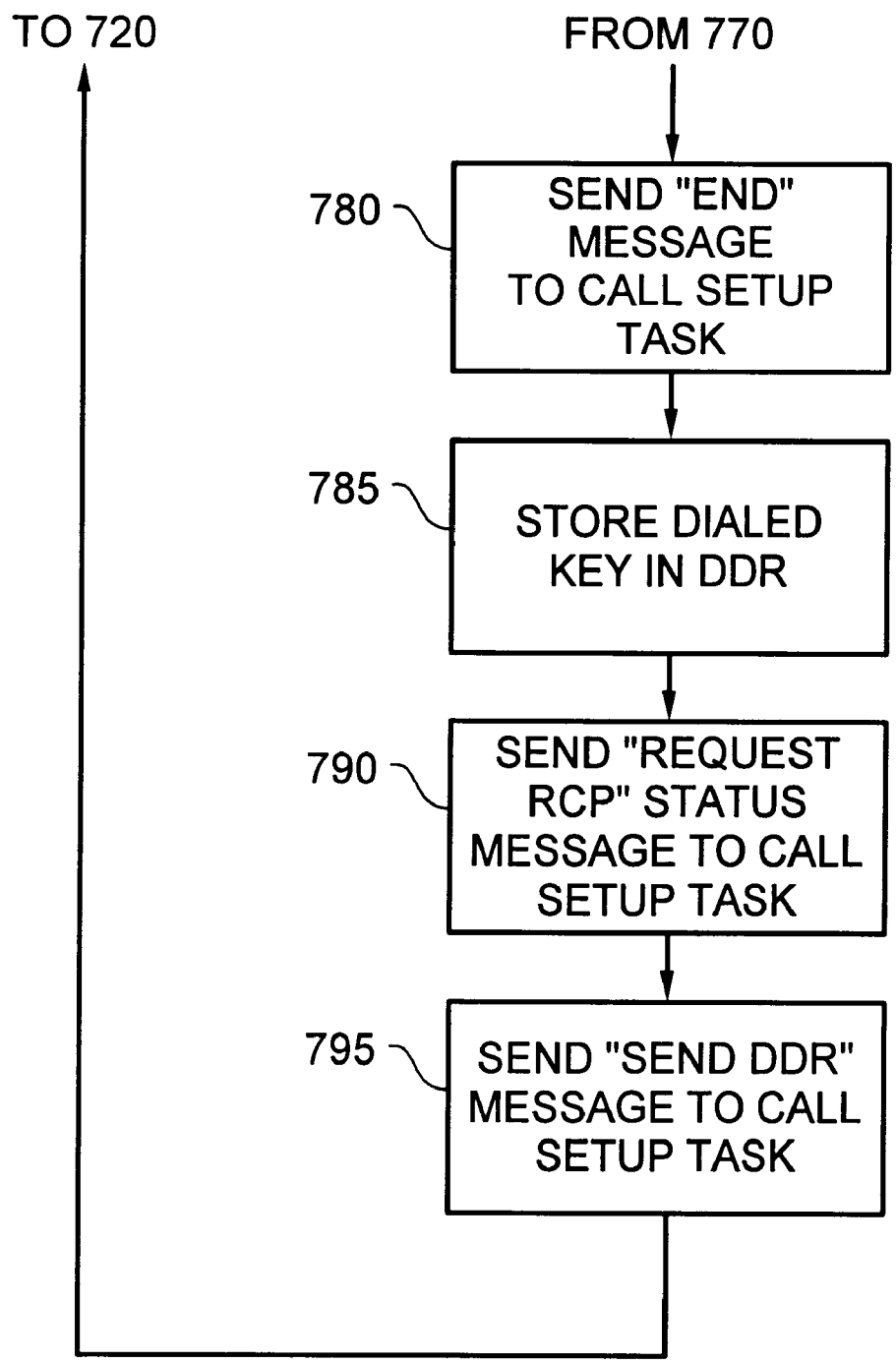
FIG. 7B is a flowchart illustrating an exemplary END-STORE-VERIFY RCP STATUS-SEND routine according to the second embodiment of the present invention.

Referring to FIG. 7B, the END-STORE-VERIFY RCP STATUS-SEND routine begins at step 780 at which the Dial Task 216 sends an 'END' message to the Call Setup Task 217, instructing the Call Setup Task to discontinue RCP status verification. The first time this message is received, the RCP status is not being verified, and the instruction is ignored.

After the 'END' message is sent, the process proceeds to step 785 at which the dialed digit is stored in the DDR 215. For the first dialed digit, the DDR 215 is empty. Each consecutively dialed digit is appended to the dialed digits previously stored in the DDR 215. Next, at step 790, the Dial Task 216 transmits a 'REQUEST RCP STATUS' message to the Call Setup Task 217, instructing the Call Setup Task to begin verification of the RCP status. At step 795, the stored dialed digits are fetched from the DDR 215, and a 'SEND DDR' message is transmitted from the Dial Task 216 to the Call Setup Task 217, the 'SEND DDR' message containing the stored dialed digits. From step 795, the process returns to step 720 in FIG. 7A.

Upon receipt of the 'SEND' message, the Call Setup Task 217 stores the dialed digits in the LDDR 218, replacing previously stored digits, and initiates RCP status verification.

During RCP status verification, one or more tasks can be performed to determine whether the RCP 130 is ready for call set up. For example, the service indication parameter of the RCP 130 can be checked to determine if the RCP is connected to the cellular network without any restrictions. The cell identification parameter of the RCP 130 can also be checked to determine if the RCP is authorized to make calls from the cell in which it is located. The SIM card parameter of the RCP 130 can also be checked to determine if the SIM card of a specific operator is allowed. The RSS of radio signals received on a radio channel by the RCP 130 can also be sampled and evaluated to determine if the radio channel is of sufficient strength to set up a call. An average radio signal strength threshold can be preconfigured in the RCP 130, and the evaluation can be performed by comparing the average with the threshold. The threshold can be reconfigured as necessary, depending on the radio propagation conditions (fading, static, etc.) in different locations. There can also be other tasks included in the RCP status verification.

To check the service indication, the cell identification parameters, and whether or not the SIM card is allowed, according to the second embodiment, the Call Setup Task 217 sends a request for these parameters to the RCP 130, and the RCP 130 responds accordingly. For RSS sampling and evaluation, the Call Setup Task 217 instructs the RCP 130 to measure the RSS for a predetermined number of samples. Alternately, the periodic RSS measurements of various radio channels made by the RCP 130 can be sampled for a predetermined number of samples. The service indication, cell identification, and SIM card parameters and the RSS measurements can be obtained by the RCP 130 according to known techniques.

During RCP status verification, the Call Setup Task 217 continuously monitors the Dial Task 216 to determine whether an 'END' message has been transmitted by the Dial Task 216. If an 'END' message has been transmitted by the Dial Task 216, the Call Setup Task 217 terminates RCP status verification.

Figure 8:
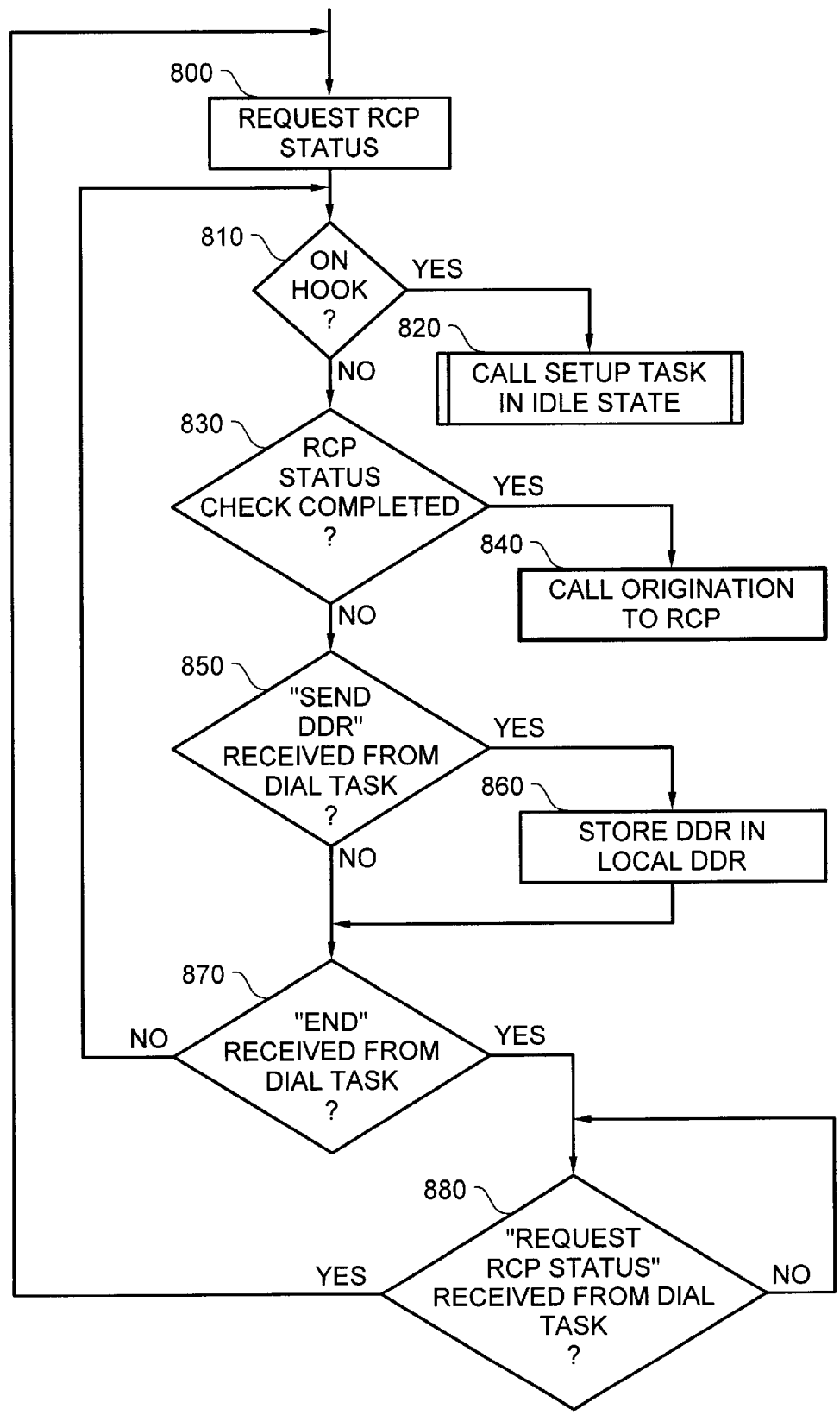
FIG. 8 is a flowchart illustrating an exemplary process performed by a call setup task according to the second embodiment of the present invention.

FIG. 8 is a flowchart illustrating an exemplary process performed by the Call Setup Task 217 according to the present invention. As shown in FIG. 8, the process begins at step 800 at which the Call Setup Task 217 begins verification of the RCP status in response to a request from the Dial Task 216. At step 810, a determination is made whether the POTS telephone 110 is on hook. If the POTS telephone 110 is on hook, the Call Setup Task 217 is put into the idle state at step 820. If, at step 810, it is determined that the POTS telephone 110 is not on hook, a determination is made whether the RCP status check is completed at step 830. If the RCP status check is completed, a Call Origination message is sent to the RCP 130 from the Call Setup Task 217 at step 840. If the RCP Status check is not completed, a determination is made at step 850 whether a 'SEND DDR' message has been received from the Dial Task 216. If the 'SEND DDR' message has been received, the contents of the DDR 215 are stored in the LDDR 218 at step 860. If the 'SEND DDR' message has not been received or after the contents of the DDR 215 have been stored in the LDDR 218, the process proceeds to step 870 at which a determination is made whether an 'END' message has been received from the Dial Task 216. If not, the process returns to step 810. If an 'END' message has been received, a determination is made at step 880 whether a request for RCP status has been received from the Dial Task 216. This step is repeated until a request for RCP status is received. Then, the process returns to step 800.

Figure 9A:
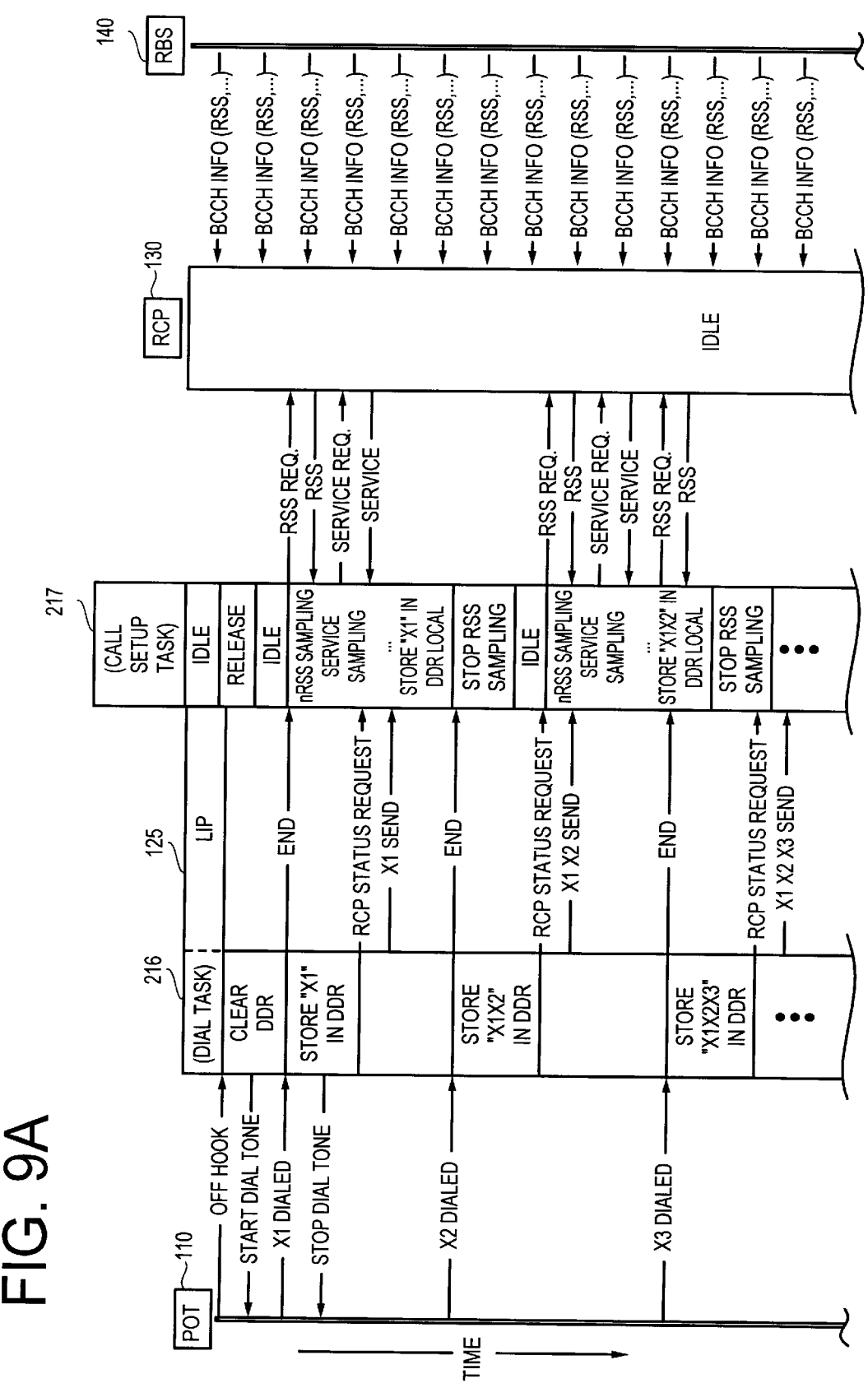
FIG. 9 illustrates an exemplary process for setting up a call using the END-STORE-VERIFY RCP STATUS-SEND routine according to the second embodiment of the present invention.
Figure 9B:
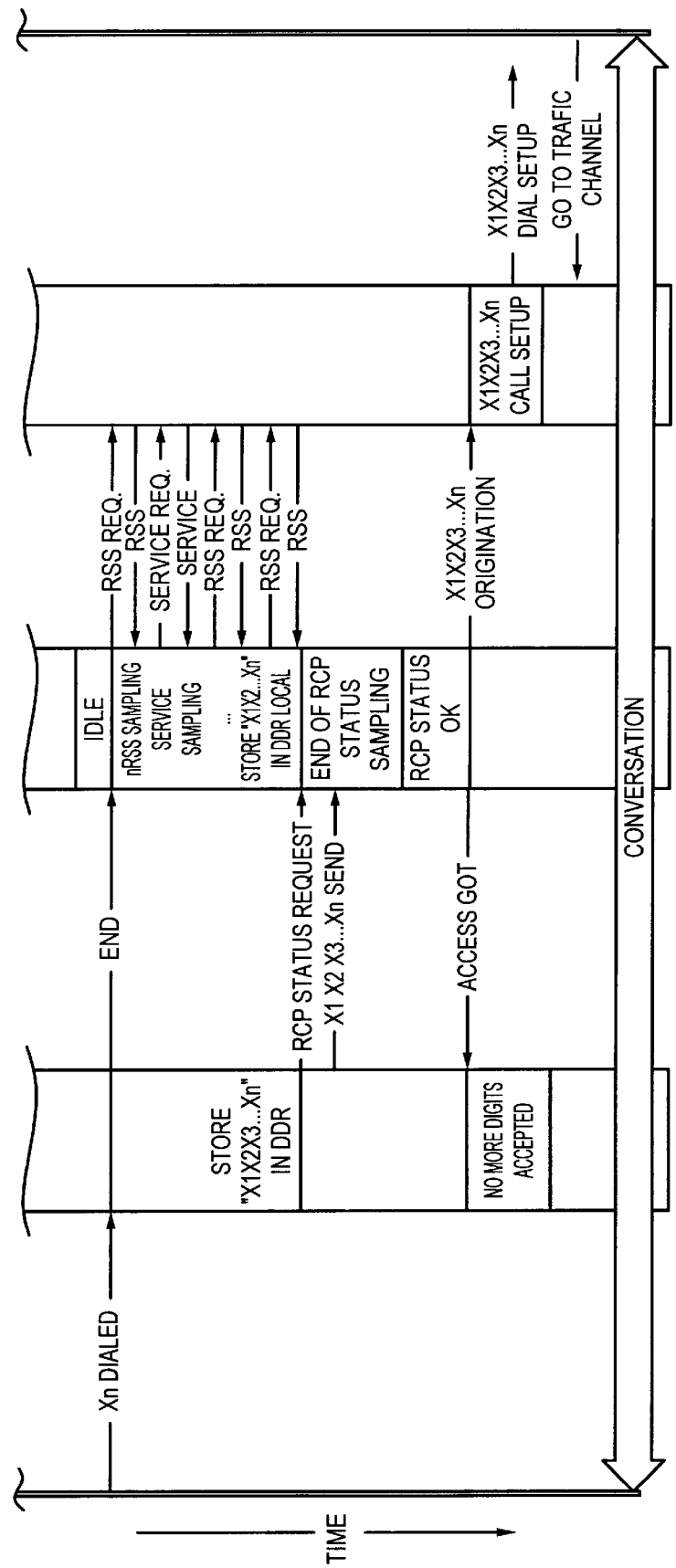

FIG. 9 illustrates how the END-STORE-VERIFY RCP STATUS-SEND routine is used to set up a call via a radio terminal according to the second embodiment of the present invention. The process in FIG. 9 is represented on a time axis.

Referring to FIG. 9, the process for setting up a call begins with the POTS telephone 110 indicating that it has gone off hook to the LIP 125. The LIP 125 clears the DDR 215 and provides a dial tone to the POTS telephone 110. At this point, dialing has not initiated yet, and the Call Setup Task 217 remains idle.

Next, the POTS telephone 110 transmits a first dialed digit, X1, to the LIP 125. The LIP 125 stops the dial tone, and the Dial Task 216 transmits an 'END' message to the Call Setup Task 217, instructing the Call Setup Task to terminate RCP status verification. The Call Setup Task 217 releases, i.e., terminates RCP status verification if it is in progress, and returns to the idle state. While the Call Setup Task 217 is releasing, the LIP 125 stores the dialed digit, X1, in the DDR 215.

Next, the Dial Task 216 transmits a 'RCP STATUS REQUEST' to the Call Setup Task 217, instructing the Call Setup Task 217 to initiate RCP status verification. The Dial Task 216 then transmits a 'SEND' message to the Call Setup Task 217, containing the dialed digit, X1. The Call Setup Task 217 stores the dialed digit, X1, in the LDDR 218. At the same time, RCP status verification is being performed, with requests for service indication, cell identification, and SIM card parameters and RSS samples being passed from the Call Setup Task 217 to the RCP 130, and the RCP 130 responding, accordingly. In FIG. 9, only the exchange of service requests and RSS requests are shown for simplicity of illustration. It should be understood, however, that there are various different requests passed between the Call Setup Task 217 and the RCP 130 during RCP status verification, depending on what tasks are included in the RCP status verification. During RCP status verification, information is only transmitted across a downlink control channel from the RBS 140 to the RCP 130.

Next, another digit, X2, is dialed and transmitted by the POTS telephone 110 to the LIP 125. Again, the Dial Task 216 transmits an 'END' message to the Call Setup Task 217, and the Call Setup Task terminates RCP status verification and returns to the idle state. While the Call Setup Task 217 is releasing, the LIP 125 stores the dialed digit, X2, in the DDR 215, appending it to the previously stored dialed digit, X1.

Next, the Dial Task 216 transmits a 'RCP STATUS REQUEST' to the Call Setup Task 217, and the Call Setup Task initiates RCP status verification. Then, the Dial Task 216 transmits a 'SEND' message to the Call Setup Task 217, containing the dialed digits, X1X2. The Call Setup Task 217 stores the dialed digits, X1X2, in the LDDR 218, replacing the dialed digit X1. The RCP 130 continues only to receive information across a downlink control channel from the RBS 140.

This process is repeated for the next digit, X3, through a dialed digit, XN. After receipt of the 'SEND' message containing the dialed digits, X1X2X3 . . . XN, the Call Setup Task 217 continues RCP status verification until it is completed, and the RCP 130 is determined to be ready for call set up.

RCP status verification is completed when all the tasks necessary for verification of the RCP status have been completed. This means, for example, that the service indication, cell identification, and SIM card parameters have been obtained from the RCP 130, along with a predetermined number of RSS samples. The number of RSS samples that should be obtained can be preconfigured as desired. When the service indication, cell identification, and SIM card parameters have been received, the Call Setup Task 217 checks to determine if the service indication contains restrictions, if the cell identification corresponds to a cell in which the RCP is authorized to make a call from, and if the SIM indication shows that the operator's SIM card is allowed. When RSS sampling is completed, the Call Setup Task 217 evaluates the RSS samples and determines whether the RSS is sufficient. The RSS may not be sufficient, for example, due to atmospheric conditions. If the RSS is not sufficient, the RCP 130 is not authorized to make a call from the cell in which it is located, or the operator's SIM card is not allowed, the call is aborted. If the service indication contains restrictions, but the RSS is sufficient and the RCP 130 is authorized to make a call from the cell in which it is located, using the operator's SIM card, then certain calls may be allowed, e.g., emergency calls. In this case, the type of call that is being set up can be determined according to known techniques, e.g., based on the dialed digits.

If the RSS is sufficient, there are no service restrictions or the call is one which is allowed despite the service restrictions, and the RCP 130 is authorized to make a call from the cell in which it is located, using the operator's SIM card, the Call Setup Task 217 sends an 'ACCESS GOT' message to the Dial Task 216 and an 'ORIGINATION' message containing the dialed digits X1X2X3 . . . XN stored in the LDDR 218 to the RCP 130. At this point, the LIP 125 stops accepting digits from the POTS telephone 110. The RCP 130, which has been idle up to this point, sends a call setup request containing the dialed digits X1X2X3 . . . XN across an uplink control channel to the RBS 140. The RBS 140 assigns an available traffic channel, and the conversation proceeds across the assigned traffic channel.

While the example illustrated in FIG. 9 describes dialed digits X1X2X3 . . . XN for purposes of illustration, it should be understood that the present invention is applicable to zero, one, or any number of dialed digits.

In the embodiment described above with reference to FIGS. 6–9, part of the call set up processing is performed in the Call Setup Task 217 in the LIP 125. Alternately, according to a third embodiment, call set up processing can be performed in the RCP 135 responsive to an LIP 127. Such an implementation requires modification of the RCP but does not require modification of the air interface.

Figure 10:
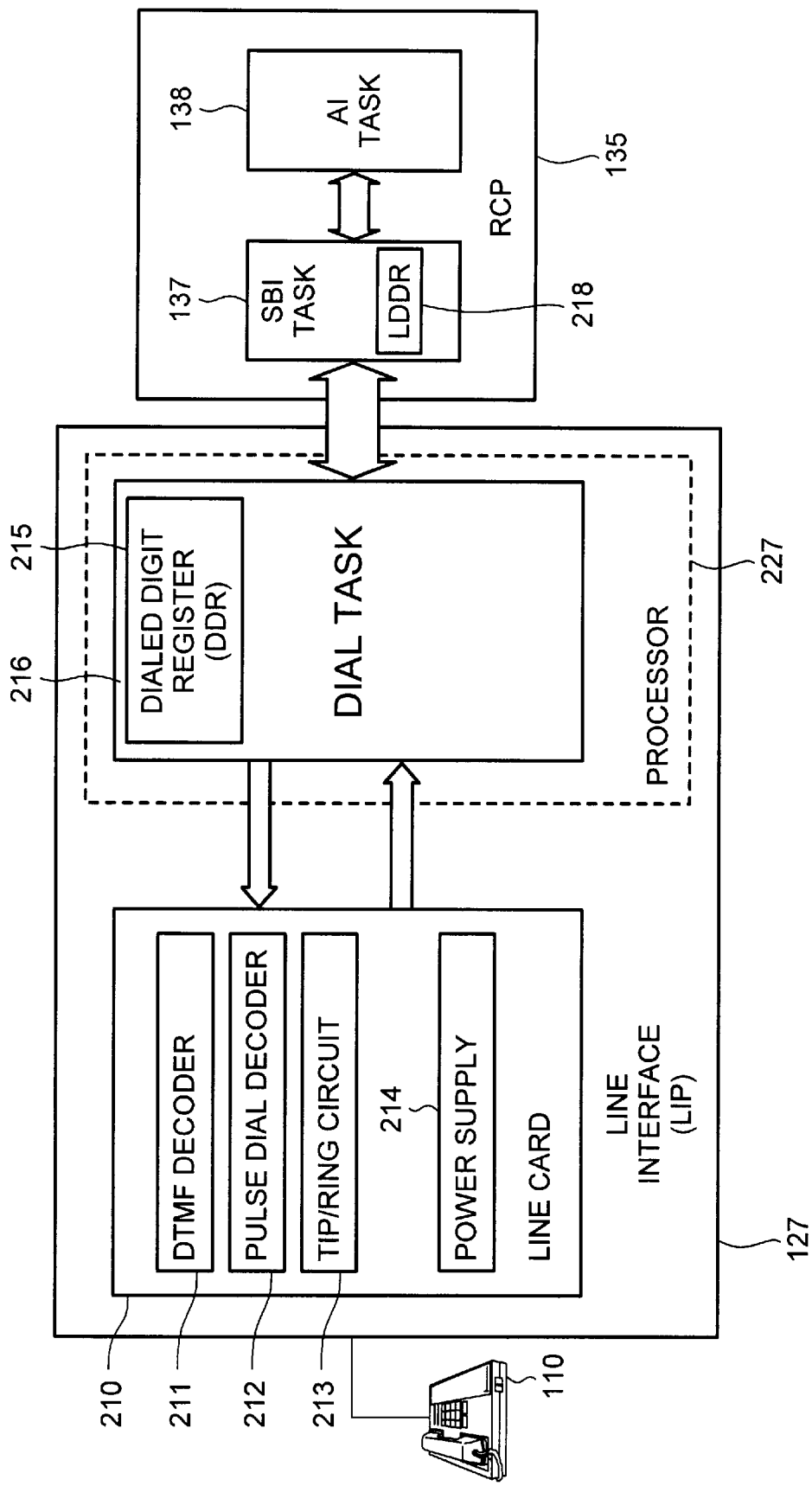
FIG. 10 is a functional block diagram illustrating details of a line interface processor according to a third embodiment of the present invention.

FIG. 10 illustrates details of a LIP 127 and a RCP 135 according to the third embodiment of the present invention. The LIP 127 is suited for enabling communication in a digital network. The LIP 127 contains similar features as the LIPs 120 and 125 illustrated in FIGS. 2 and 6, respectively, including a Line Card 210 and a Processor 227. The Processor 227 differs from the Processor 225 in that it includes a Dial Task 216 but not a Call Setup Task 217. Instead of a Call Setup Task 217, there is a SBI Task 137 included in the RCP 135. The DDR 215 is included in the Dial Task 216, and the LDDR 218 is included in the SBI Task 137.

In addition to the SBI Task 137, the RCP 135 also includes an Air Interface (AI) Task 138 which handles communications to and from the RBS 140.

The Dial Task 216 receives dialed digits from the Line Card 210 and stores each dialed digit in the DDR 215. The dialed digits are appended to dialed digits previously stored in the DDR 215. The Dial Task 216 also retrieves stored dialed digits from the DDR 215 and sends the stored dialed digits to the LDDR 218 in the SBI Task 137.

The SBI Task 137 communicates with the Dial Task 216 and the AI Task 138 regarding RCP status verification and call setup processing. Also, the SBI Task 137 sends dialed digits from the LDDR 218 to the AI Task 138 with a 'CALL SETUP' message, when verification of the RCP status is completed. The SBI Task 137 can be implemented, for example, with a conventional programmable microprocessor running a multitasking application configured around a standard or specially configured real time operating system.

When the AI Task 138 receives a 'CALL SETUP' message from the SBI Task 137, it establishes the call setup procedure according to the corresponding cellular standard, e.g., GSM, DAMPS, PDC, etc.

Figure 11A:
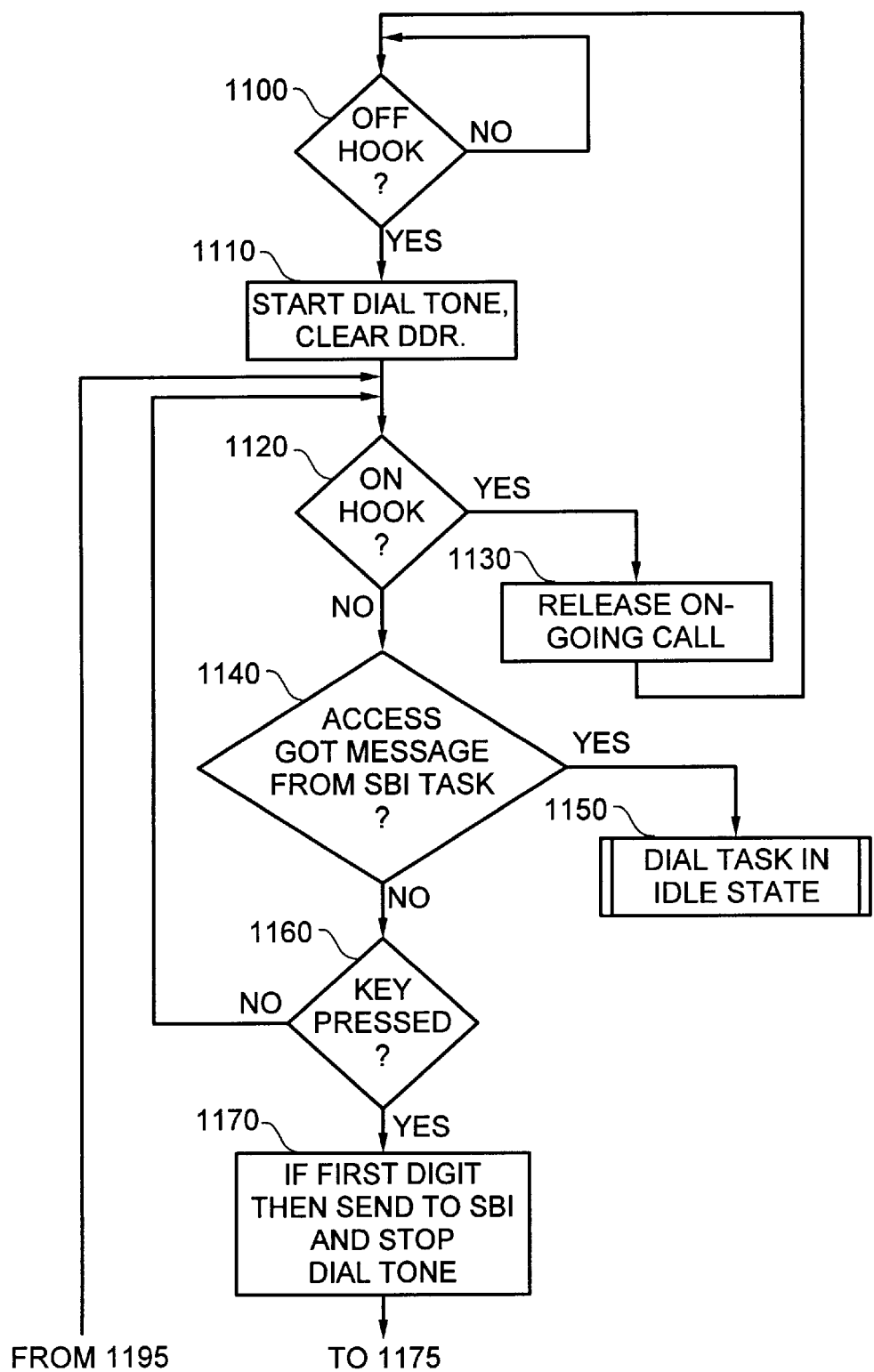
FIG. 11A is a flowchart illustrating an exemplary dialed digit transfer process according to the third embodiment of the present invention.

FIG. 11A illustrates an exemplary dialed digit transfer process when the RCP 135 is initially in an idle state according to the third embodiment of the present invention. The process begins at step 1100 at which the Line Card 210 monitors the hook switch status of the POTS telephone 110 to determine if the POTS telephone is off-hook. If the POTS telephone 110 is determined not to be off-hook, step 1100 is repeated, and the Line Card 210 continues monitoring the hook switch status. When the Line Card 210 determines that the POTS telephone 110 is off-hook, for example because the subscriber has lifted the receiver, the process proceeds to step 1110 at which the Line Card 210 provides a dial tone to the POTS telephone 110 and sends an off-hook indication to the Dial Task 216. Upon receipt of the off-hook indication, the Dial Task 216 clears the DDR 215.

Next, at step 1120, a determination is made whether the POTS telephone 110 is on-hook, e.g., because the subscriber has hung up. If the subscriber is on-hook, the ongoing call is released, if there is one, at step 1130, and the process return to step 1100. If the subscriber is not on-hook, the process proceeds to step 1140 at which the Dial Task 216 determines whether the SBI Task 137 has transmitted an 'ACCESS GOT' message, indicating that a 'CALL SETUP' message has been transmitted to the AI Task 138 from the SBI Task 137, and no more digits will be accepted from the POTS telephone 110.

If the Dial Task 216 determines that an 'ACCESS GOT' message has been received, the Dial Task 216 is put in an idle state at step 1150. If the Dial Task 216 determines that an 'ACCESS GOT' message has not been received, the Line Card 210 next detects whether a DTMF tone (or, alternately, a pulsed-dial signal) has been received, indicating that a key on the POTS telephone 110 has been pressed (step 1160). If a key has not been pressed, the process returns to step 1120. If a key has been pressed, the process proceeds to step 1170. At step 1170, the SBI Task 137 is awakened, and the dial tone is stopped, if the key pressed corresponds to a first digit dialed. The DTMF Decoder 211 determines which key was pressed (i.e., which digit was dialed) and presents the dialed digit to the Dial Task 216. When the Dial Task 216 receives the dialed digit, the END-STORE-SEND/VERIFY RCP STATUS routine shown in FIG. 11B is executed.

Figure 11B:
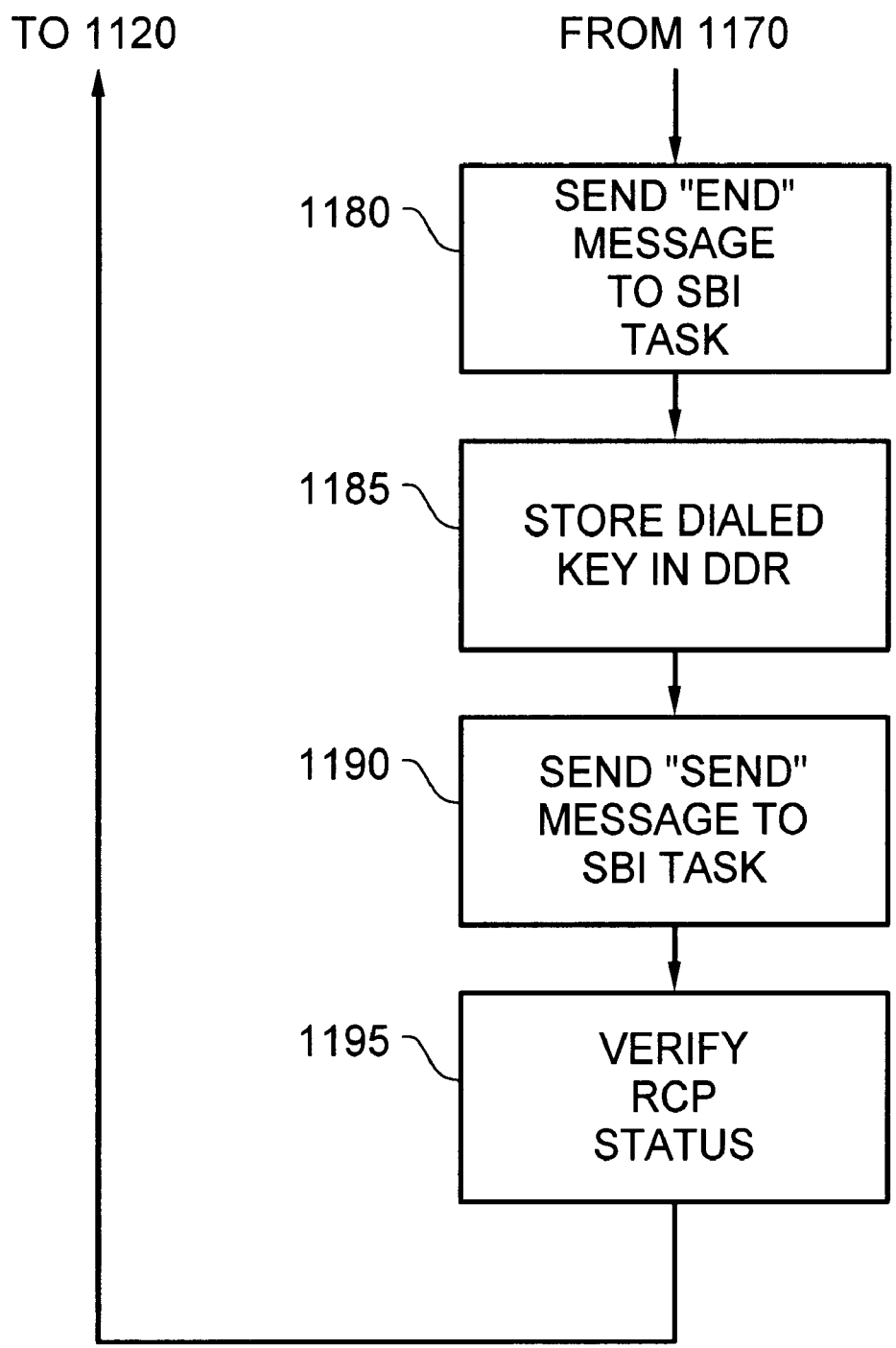
FIG. 11B is a flowchart illustrating an exemplary END-STORE-SEND/VERIFY RCP STATUS routine according to the third embodiment of the present invention.

Referring to FIG. 11B, the END-STORE-SEND/VERIFY RCP STATUS routine begins at step 1180 at which the Dial Task 216 sends an 'END' message to the SBI Task 137, instructing the SBI Task 137 to discontinue RCP status verification. The first time this message is received, the RCP status is not being verified, and the instruction is ignored.

After the 'END' message is sent, the process proceeds to step 1185 at which the dialed digit is stored in the DDR 215. For the first dialed digit, the DDR 215 is empty. Each consecutively dialed digit is appended to the dialed digits previously stored in the DDR 215. At step 1190, the stored dialed digits are fetched from the DDR 215, and a 'SEND' message is transmitted from the Dial Task 216 to the SBI Task 137, the 'SEND' message containing the stored dialed digits and an instruction to begin RCP status verification. At step 1195, the RCP status is verified. From step 1195, the process returns to step 1120 in FIG. 11A.

Upon receipt of the 'SEND' message, the SBI Task 137 stores the dialed digits in the LDDR 218, replacing previously stored digits, and initiates RCP status verification.

During RCP status verification, one or more tasks can be performed to determine whether the RCP 135 is ready for call set up. For example, the service indication, cell identification, and SIM card parameter of the RCP 135 can be checked, and the RSS of radio signals received on a radio channel by the RCP 135 can also be sampled and evaluated as described above.

To check the service indication, cell identification, and SIM card indication parameters, the SBI Task 137 sends a request for these parameters to the AI Task 138, and the AI Task 138 responds accordingly. For RSS sampling and evaluation, the SBI Task 137 instructs the AI Task 138 to measure the RSS for a predetermined number of samples. Alternately, the periodic RSS measurements of various radio channels made by the AI Task 138 can be sampled for a predetermined number of samples. The service indication, cell identification, and SIM card parameters and the RSS measurements can be obtained by the AI Task 138 according to known techniques.

During RCP status verification, the SBI Task 137 continuously monitors the Dial Task 216 to determine whether an 'END' message has been transmitted by the Dial Task 216. If an 'END' message has been transmitted by the Dial Task 216, the SBI Task 137 terminates RCP status verification.

Figure 12:
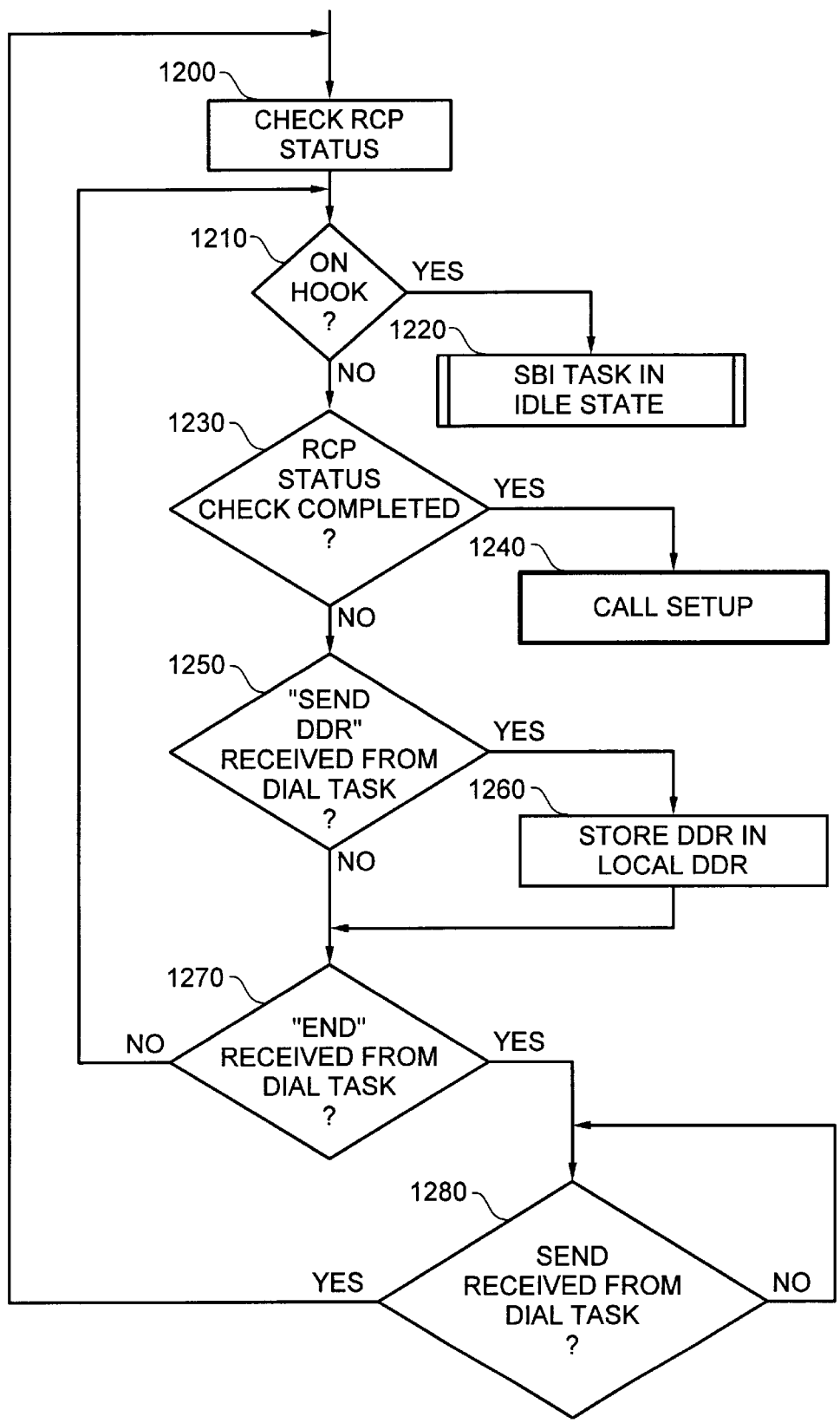
FIG. 12 is a flowchart illustrating an exemplary process performed by a system bus interface according to the third embodiment of the present invention.

FIG. 12 is a flowchart illustrating an exemplary process performed by the SBI Task 137 according to the present invention. As shown in FIG. 12, the process begins at step 1200 at which the SBI Task 137 begins verification of the RCP status in response to a 'SEND' message sent from the Dial Task 216 to the SBI Task 137. At step 1210, a determination is made whether the POTS telephone 110 is on hook. If the POTS telephone 110 is on hook, the SBI Task 137 is put into the idle state at step 1220. If, at step 1210, it is determined that the POTS telephone 110 is not on hook, a determination is made whether the RCP status verification is completed at step 1230. If the RCP status verification is completed, a 'CALL SETUP' message is sent from the SBI Task 137 to the AI Task 138 at step 1240. If the RCP Status verification is not completed, a determination is made at step 1250 whether a 'SEND' message has been received form the Dial Task 216. If the 'SEND' message has been received, the contents of the DDR 215 are stored in the LDDR 218 at step 1260. If the 'SEND' message has not been received or after the contents of the DDR 215 have been stored in the LDDR 218, the process proceeds to step 1270 at which a determination is made whether an 'END' message has been received from the Dial Task 216. If not, the process returns to step 1210. If an 'END' message has been received, a determination is made at step 1280 whether a 'SEND' message has been received from the Dial Task 216. This step is repeated until a 'SEND' message is received. Then, the process returns to step 1200.

Figure 13A:
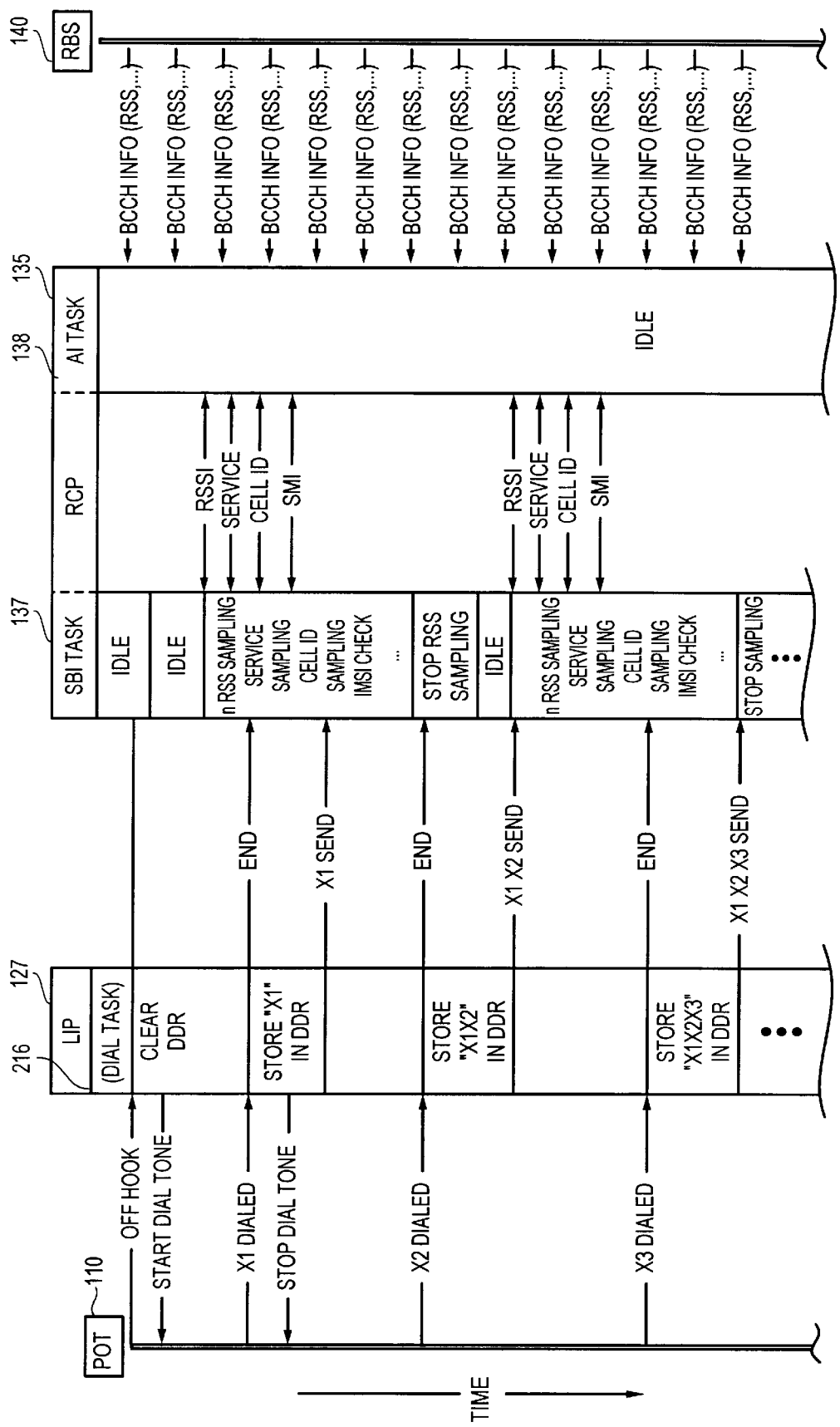
FIG. 13 illustrates an exemplary process for setting up a call using the END-STORE-SEND/VERIFY RCP STATUS routine according to the third embodiment of the present invention.
Figure 13B:
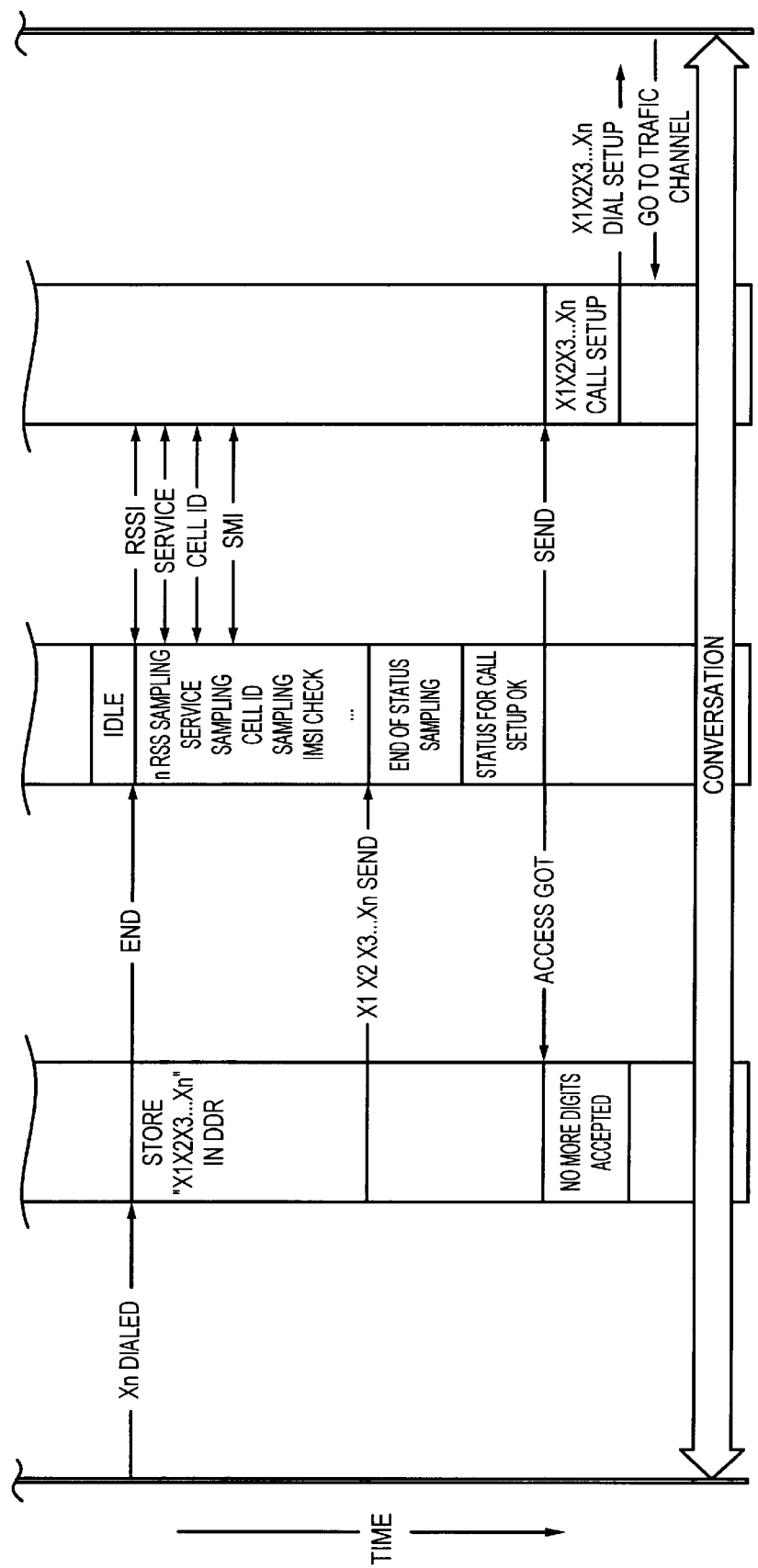

FIG. 13 illustrates how the modified END-STORE-SEND/VERIFY RCP STATUS routine is used to set up a call via a radio terminal according to the third embodiment of the present invention. The process in FIG. 13 is represented on a time axis.

Referring to FIG. 13, the process for setting up a call begins with the POTS telephone 110 indicating that it has gone off hook to the LIP 127. The LIP 127 clears the DDR 215 and provides a dial tone to the POTS telephone 110. At this point, dialing has not initiated yet, and the SBI Task 137 remains idle.

Next, the POTS telephone 110 transmits a first dialed digit, X1, to the LIP 127. The LIP 127 stops the dial tone, and the Dial Task 216 transmits an 'END' message to the SBI Task 137, instructing the SBI Task 137 to terminate RCP status verification. The SBI Task 137 remains in the idle state. The LIP 127 stores the dialed digit, X1, in the DDR 215.

Next, the Dial Task 216 transmits a 'SEND' message to the SBI Task 137, containing the dialed digit, X1, and instructing the SBI Task 137 to begin RCP status verification. The SBI Task 137 stores the dialed digit, X1, in the LDDR 218. At the same time, RCP status verification is being performed, with requests for service indication, cell identification, and SIM card parameters and RSS samples being passed from the SBI Task 137 to the AI Task 138, and the AI Task 138 responding, accordingly. It should be understood that the requests passed between the SBI Task 137 and the AI Task 138 during RCP status verification may vary, depending on what tasks are included in the RCP status verification. During RCP status verification, information is only transmitted across a downlink control channel from the RBS 140 to the RCP 135.

Next, another digit, X2, is dialed and transmitted by the POTS telephone 110 to the LIP 127. Again, the Dial Task 216 transmits an 'END' message to the SBI Task 137, and the SBI Task 137 terminates RCP status verification and returns to the idle state. While the SBI Task 137 is releasing, the LIP 127 stores the dialed digit, X2, in the DDR 215, appending it to the previously stored dialed digit, X1.

Next, the Dial Task 216 transmits a 'SEND' message to the SBI Task 137, containing the dialed digits, X1X2, and the SBI Task 137 begins RCP status verification again. The SBI Task 137 stores the dialed digits, X1X2, in the LDDR 218, replacing the dialed digit X1. The RCP 135 continues only to receive information across a downlink control channel from the RBS 140.

This process is repeated for the next digit, X3, through a dialed digit, XN. After receipt of the 'SEND' message containing the dialed digits, X1X2X3 ... XN, the SBI Task 137 continues RCP status verification until it is completed, and the RCP 135 is determined to be ready for call set up.

RCP status verification is completed when all the tasks necessary for verification of the RCP status have been completed as described above. When RCP status verification has been completed and the RCP 135 is determined to be ready for call setup, the SBI Task 137 sends an 'ACCESS GOT' message to the Dial Task 216 and a 'CALL SETUP' message containing the dialed digits X1X2X3 ... XN stored in the LDDR 218 to the AI Task 138. At this point, the LIP 127 stops accepting digits from the POTS telephone 110. The AI Task 138, which has been idle up to this point, sends a call setup request containing the dialed digits X1X2X3 ... XN across an uplink control channel to the RBS 140. The RBS 140 assigns an available traffic channel, and the conversation proceeds across the assigned traffic channel.

While the example illustrated in FIG. 13 describes dialed digits X1X2X3 ... XN for purposes of illustration, it should be understood that the present invention is applicable to zero, one, or any number of dialed digits.

According to the present invention, a user of any type of analog terminal can successfully set up a call to a remote terminal via a radio terminal simply by dialing the number of the desired terminal. To the user, the operation of an analog terminal according to the present invention is the same as the operation of an analog terminal connected to a local exchange. The present invention can be employed in various types of existing cellular networks, without requiring a change in the architecture of the MSC's.

It will be understood that the invention is not limited to the particular embodiments that are described and illustrated above. For example, although the embodiments are described above with reference to a cellular radio communication system, the present invention is applicable to any type of radio communication system. The specification contemplates any and all modifications that fall within the scope of the invention as defined by the following claims.

What is claimed is:

1. A method of setting up a call between at least one standard analog terminal and a remote terminal in a network via a radio terminal and a radio base station, the method comprising the following steps:

a) clearing the contents of a memory;
   b) receiving a first dialed digit from the standard analog terminal;
   c) terminating verification of radio terminal status;
   d) storing the first dialed digit in the memory, wherein the first dialed digit forms the contents of the memory;
   g) initiating verification of the radio terminal status;
   h) sending the contents of the memory to a buffer;

i) receiving a subsequently dialed digit from the standard analog terminal;

j) terminating verification of the radio terminal status;

k) storing the subsequently dialed digit in the memory, together with the contents of the memory, to form updated contents;

l) initiating verification of the radio terminal status;

m) sending the updated contents to the buffer; and n) repeating the steps i–m.

2. The method of claim 1, wherein the verification of the radio terminal status includes at least one of sampling and evaluation of radio signal strengths, determining service restrictions of the radio terminal, determining whether the radio terminal is authorized to make a call from the cell in which it is located, and determining whether the radio terminal is authorized to make a call using the an operator's SIM card.

3. The method of claim 1, wherein the steps of initiating verification of the radio terminal status and sending the contents of the memory to the buffer are performed at the same time.

4. The method of claim 1, wherein when verification of the radio terminal status is completed, and the radio terminal is determined to be ready for call set up processing, the updated contents are sent from the buffer to the radio terminal to begin call set up processing.

5. The method of claim 4, wherein the steps i–m are repeated for each subsequently dialed digit, as long as the subsequently dialed digit is received from the standard analog terminal before the updated contents are sent from the buffer to the radio terminal.

6. The method of claim 1, wherein when verification of the radio terminal status is completed, and the radio terminal is determined to be ready for call set up processing, a request for call setup is sent from the radio terminal to the radio base station.

7. The method of claim 6, wherein the steps i–m are repeated for each subsequently dialed digit, as along as the subsequently dialed digit is received from the from the standard analog terminal before the radio terminal sends the request for call setup p to the radio base station.

8. An apparatus for setting up a call between at least one standard analog terminal and a remote terminal in a network via a radio terminal, the apparatus comprising:

a processor receiving a first dialed digit from the standard analog terminal and terminating radio terminal status verification;

a memory storing the first dialed digit; and a buffer to which the first dialed digit is sent, wherein the memory is initially cleared, the first dialed digit forms the contents of the memory, and the processor initiates radio terminal status verification and sends the contents of the memory to the buffer, and wherein if subsequently dialed digits are received from the standard analog terminal, the processor terminates radio terminal status verification, the contents of the memory are updated to include the subsequently dialed digits, and the processor initiates radio terminal status verification and sends the updated contents of the memory to the buffer.

9. The apparatus of claim 8, wherein the verification of the radio terminal status includes at least one of sampling and evaluation of radio signal strengths, determining service restrictions of the radio terminal, determining whether the radio terminal is authorized to make a call from the cell in which it is located, and determining whether the radio terminal is authorized to make a call using an operator's SIM card.

10. The apparatus of claim 8, wherein when the radio terminal status verification is completed, and the radio terminal is determined to be ready for call set up processing, the processor sends the updated contents from the buffer to the radio terminal with an instruction to initiate call set up processing.

11. The apparatus of claim 10, wherein for each subsequently dialed digit, the processor terminates radio terminal status verification, the contents of the memory are updated to include the subsequently dialed digit, and the processor initiates radio terminal status verification and sends the updated contents of the memory to the buffer, as long as the subsequently dialed digit is received from the standard analog terminal before the updated contents are sent from the buffer to the radio terminal.

12. A system for setting up a call between at least one standard analog terminal and a remote terminal in a network via a radio terminal and a radio base station, the apparatus comprising:

a processor receiving a first dialed digit from the standard analog terminal;

a memory storing the first dialed digit;

a buffer to which the first dialed digit is sent; and an interface for terminating radio terminal status verification;

wherein the memory is initially cleared, the first dialed digit forms the contents of the memory, the processor sends the contents of the memory to the buffer, and and the interface initiates radio terminal status verification;

wherein if subsequently dialed digits are received from the standard analog terminal, the interface terminates radio terminal status verification, the contents of the memory are updated to include the subsequently dialed digits, and the processor sends the updated contents of the memory to the buffer, and the interface initiates radio terminal status verification.

13. The system of claim 12, wherein the verification of the radio terminal status includes at least one of sampling and evaluation of radio signal strengths, determining service restrictions of the radio terminal, determining whether the radio terminal is authorized to make a call from the cell in which it is located, and determining whether the radio terminal is authorized to make a call using an operator's SIM card.

14. The system of claim 12, wherein when the radio terminal status verification is completed, and the radio terminal is determined to be ready for call set up processing, the radio terminal sends a request for call set up to the radio base station.

15. The system of claim 14, wherein for each subsequently dialed digit, radio terminal status verification is terminated, the contents of the memory are updated to include the subsequently dialed digit, the processor sends the updated contents of the memory to the buffer, and the interface initiates radio terminal status verification, as long as the subsequently dialed digit is received from the standard analog terminal before the radio terminal sends the request for call setup to the radio base station.

16. A method of establishing a connection between at least one standard analog terminal and a remote terminal in a network via a radio terminal and a radio base station, the method comprising the following steps:

a) ending verification of the radio terminal status upon receipt of a dialed digit from the standard analog terminal;

b) storing the dialed digit, appending the dialed digit to previously stored dialed digits;

c) initiating verification of the radio terminal status;

d) sending the stored dialed digit to a buffer; and e) repeating steps a–d.

17. The method of claim 16, wherein the verification of the radio terminal status includes at least one of radio signal strength sampling and evaluation, determining service restrictions of the radio terminal, determining whether the radio terminal is authorized to make a call from the cell in which it is located, and determining whether the radio terminal is authorized to make a call using an operator's SIM card.

18. The method of claim 17, wherein when verification of the radio terminal status is completed, and the radio terminal is determined to be ready for call set up processing, the stored dialed digits are sent from the buffer to the radio terminal with an instruction to begin call set up processing, and wherein steps a–d are repeated for each dialed digit received from the standard analog terminal, as long as the dialed digit is received before the stored dialed digits are sent from the buffer to the radio terminal.

19. The method of claim 16, wherein when verification of the radio terminal status is completed, and the radio terminal is determined to be ready for call set up processing, the radio terminal sends a request for call setup to the radio base station, and wherein steps a–d are repeated for each dialed digit received from the standard analog terminal, as long as the dialed digit is received before the request for call set up is sent to the radio base station from the radio terminal.

* * * * *